US010057019B2

(12) United States Patent
Jiang et al.

(10) Patent No.: US 10,057,019 B2
(45) Date of Patent: Aug. 21, 2018

(54) MEDIA ACCESS CONTROL (MAC) LAYER CODING AND HYBRID AUTOMATIC REPEAT REQUEST (HARQ) FOR EFFICIENT RECEIVER PIPELINE PROCESSING IN SELF-CONTAINED TIME DIVISION DUPLEX (TDD) SUBFRAME

(71) Applicant: QUALCOMM Incorporated, San Diego, CA (US)

(72) Inventors: Jing Jiang, San Diego, CA (US); Peter Pui Lok Ang, San Diego, CA (US); Krishna Kiran Mukkavilli, San Diego, CA (US); Naga Bhushan, San Diego, CA (US); Tingfang Ji, San Diego, CA (US); John Edward Smee, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 15/044,881

(22) Filed: Feb. 16, 2016

(65) Prior Publication Data
US 2016/0329995 A1  Nov. 10, 2016

Related U.S. Application Data

(60) Provisional application No. 62/159,029, filed on May 8, 2015.

(51) Int. Cl.
*H04L 1/18* (2006.01)
*H04L 5/14* (2006.01)
*H04L 1/00* (2006.01)

(52) U.S. Cl.
CPC .......... *H04L 1/1861* (2013.01); *H04L 1/0057* (2013.01); *H04L 1/1819* (2013.01);
(Continued)

(58) Field of Classification Search
CPC ..... H04W 4/005; H04W 28/06; H04W 48/00; H04W 72/12; H04L 1/0057; H04L 1/1819;
(Continued)

(56) References Cited

U.S. PATENT DOCUMENTS

2007/0110095 A1\* 5/2007 Attar .................... H04L 1/0051
370/458
2009/0103635 A1\* 4/2009 Pahalawatta ........... H04L 1/007
375/240.27
(Continued)

FOREIGN PATENT DOCUMENTS

| EP | 2645611 A1 | 10/2013 |
| WO | WO-2009134100 A2 | 11/2009 |
| WO | WO-2009137464 A2 | 11/2009 |

OTHER PUBLICATIONS

International Search Report and Written Opinion—PCT/US2016/031204—ISA/EPO—Sep. 14, 2016.

*Primary Examiner* — Awet Haile
*Assistant Examiner* — Prince A Mensah
(74) *Attorney, Agent, or Firm* — Qualcomm IP Dept.; James Hunt Yancey, Jr.

(57) ABSTRACT

In an aspect of the disclosure, a method, a computer program product, and an apparatus are provided. The method may be performed by a subordinate entity. The subordinate entity receives a transmission from the scheduling entity in a data portion of the subframe. The subordinate entity processes, in the subframe, at least a part of the transmission. The subordinate entity then determines whether to send an acknowledgment (ACK) signal for the transmission, the ACK signal to be transmitted in an ACK portion of the subframe before a remaining part of the transmission is processed, and sends the ACK signal to the scheduling entity in the ACK portion of the subframe based on the determination. The data portion and the ACK portion are contained in the subframe.

30 Claims, 14 Drawing Sheets

(52) U.S. Cl.
CPC .............. *H04L 1/1854* (2013.01); *H04L 5/14* (2013.01); *H04L 1/1896* (2013.01)

(58) Field of Classification Search
CPC ... H04L 1/1854; H04L 1/1861; H04L 1/1896; H04L 5/14
See application file for complete search history.

(56) References Cited

U.S. PATENT DOCUMENTS

| | | | |
|---|---|---|---|
| 2009/0185476 A1 | 7/2009 | Tsai et al. | |
| 2009/0262710 A1* | 10/2009 | Doi | H04W 56/001 370/336 |
| 2009/0274139 A1* | 11/2009 | Palanki | H04L 1/1854 370/349 |
| 2009/0318152 A1* | 12/2009 | Maheshwari | H04L 1/1822 455/436 |
| 2011/0099446 A1 | 4/2011 | Murakami | |
| 2012/0099526 A1* | 4/2012 | Murase | H04L 1/0045 370/328 |
| 2012/0243515 A1* | 9/2012 | Xue | H03M 13/23 370/336 |
| 2014/0082455 A1* | 3/2014 | Yosoku | G06F 11/10 714/763 |
| 2015/0319771 A1* | 11/2015 | Hill | H04W 72/1257 370/330 |
| 2016/0249329 A1* | 8/2016 | Au | H04W 48/00 |

* cited by examiner

MEDIA ACCESS CONTROL (MAC) LAYER CODING AND HYBRID AUTOMATIC REPEAT REQUEST (HARQ) FOR EFFICIENT RECEIVER PIPELINE PROCESSING IN SELF-CONTAINED TIME DIVISION DUPLEX (TDD) SUBFRAME

PRIORITY CLAIM

This application claims priority to and the benefit of provisional patent application No. 62/159,029 filed in the United States Patent and Trademark Office on May 8, 2015, the entire content of which is incorporated herein by reference.

TECHNICAL FIELD

Aspects of the present disclosure relate generally to wireless communication systems, and more particularly, to a media access control (MAC) layer coding and a Hybrid Automatic Repeat Request (HARQ) for efficient receiver pipeline processing in self-contained time division duplex (TDD) subframe.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Examples of telecommunication standard include Long Term Evolution (LTE) and LTE-Advanced (LTE-A), which include a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in multiple access technologies technology. Preferably, these improvements should be applicable to existing and developing multi-access technologies and the telecommunication standards that employ such technologies.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some examples, a method of wireless communication in a synchronous network for a subordinate entity to communicate with a scheduling entity utilizing a time division duplex (TDD) carrier including a subframe is disclosed. Here, the method includes receiving a transmission from the scheduling entity in a data portion of the subframe; processing, in the subframe, at least a part of the transmission; determining whether to transmit an acknowledgment (ACK) signal for the transmission, the ACK signal to be transmitted in an ACK portion of the subframe before a remaining part of the transmission is processed, wherein the data portion and the ACK portion are contained in the subframe; and transmitting the ACK signal to the scheduling entity in the ACK portion of the subframe based on the determination.

In further examples, a subordinate entity configured to communicate with a scheduling entity in a wireless communication network is disclosed. Here, the subordinate entity includes a processor, a transceiver communicatively coupled to the processor, and a memory communicatively coupled to the processor. The processor and the memory are configured to receive a transmission from the scheduling entity in a data portion of the subframe; to process, in the subframe, at least a part of the transmission; to determine whether to transmit an acknowledgment (ACK) signal for the transmission, the ACK signal to be transmitted in an ACK portion of the subframe before a remaining part of the transmission is processed, wherein the data portion and the ACK portion being contained in the subframe; and to transmit the ACK signal to the scheduling entity in the ACK portion of the subframe based on the determination.

In further examples, a method of wireless communication in a synchronous network for a scheduling entity to communicate with a subordinate entity utilizing a time division duplex (TDD) carrier including a subframe is disclosed. Here, the method includes receiving a report from the subordinate entity including a processing capability of the subordinate entity; transmitting a configuration message to the subordinate entity based on the processing capability of the subordinate entity, the configuration message configured to enable the subordinate entity to transmit an acknowledgment (ACK) signal for a transmission received in a subframe before processing of the transmission is completed by the subordinate entity; transmitting the transmission to the subordinate entity in a data portion of the subframe; and receiving the ACK signal for the transmission in an ACK portion of the subframe.

In further examples, a scheduling entity configured to manage a wireless communication network is disclosed. Here, the scheduling entity includes a processor, a transceiver communicatively coupled to the processor, and a memory communicatively coupled to the processor. The processor and the memory are configured to receive a report from the subordinate entity including a processing capability of the subordinate entity; to transmit a configuration message to the subordinate entity based on the processing capability of the subordinate entity, the configuration message configured to enable the subordinate entity to transmit an acknowledgment (ACK) signal for a transmission received in a subframe before processing of the transmission is completed by the subordinate entity; to transmit the transmission to the subordinate entity in a data portion of the subframe; and to receive the ACK signal for the transmission in an ACK portion of the subframe.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
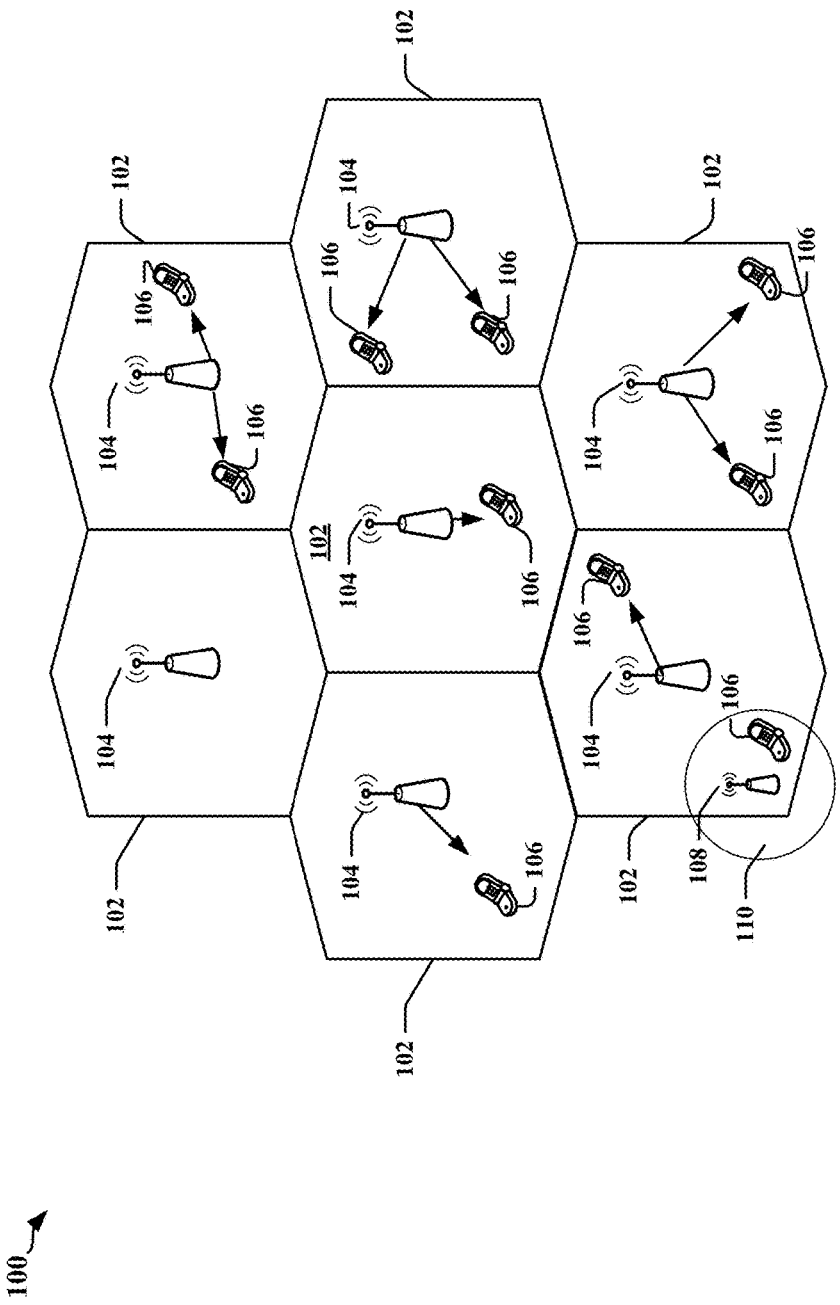
FIG. 1 is a diagram illustrating an example of a network architecture.

FIG. 1 is a diagram illustrating a generalized example of an access network 100. In this example, the access network 100 is divided into a number of cellular regions (cells) 102. One or more lower power class base stations 108 may have a cellular region 110 that overlaps with one or more of the cells 102. The lower power class base station 108 may be a femto cell (e.g., home Node B), pico cell, micro cell, remote radio head, or in some instances, another user equipment (UE) 106. The base stations 104 are each assigned to a respective cell 102 and are configured to provide an access point to a core network for all the UEs 106 in the cells 102. There is no centralized controller in this example of an access network 100, but a centralized controller may be used in alternative configurations. The base stations 104 are responsible for all radio related functions including radio bearer control, admission control, mobility control, scheduling, security, and connectivity to a serving gateway.

The modulation and multiple access scheme employed by the access network 100 may vary depending on the particular telecommunications standard being deployed. In some radio access networks, such as those defined according to the evolved packet system (EPS) or long-term evolution (LTE), orthogonal frequency division multiplexing (OFDM) may be used on the downlink (DL) and single-carrier frequency division multiple access (SC-FDMA) may be used on the uplink (UL) to support both frequency division duplexing (FDD) and time division duplexing (TDD). As those skilled in the art will readily appreciate from the detailed description to follow, the various concepts presented herein are well suited for various applications including telecommunication standards employing other modulation and multiple access techniques. By way of example, these concepts may be employed in future fifth-generation (5G) standards, LTE, Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards, employing code division multiple access (CDMA) to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, the Universal Mobile Telecommunications System (UMTS) mobile standard, LTE and GSM are described in documents from the 3GPP organization. The actual wireless communication standard and the multiple access technology employed will depend on the specific application.

The base stations 104 may have multiple antennas supporting multiple-input multiple-output (MIMO) antenna technology. The use of MIMO antenna technology enables the base stations 104 to exploit the spatial domain to support spatial multiplexing, beamforming, and transmit diversity. Spatial multiplexing may be used to transmit different streams of data simultaneously on the same frequency. The data streams may be transmitted to a single UE 106 to increase the data rate or to multiple UEs 106 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 106 with different spatial signatures, which enables each of the UE(s) 106 to recover the one or more data streams destined for that UE 106. On the UL, each UE 106 may transmit a spatially precoded data stream, which enables the base station 104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Certain aspects of an access network described herein may relate to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a discrete Fourier transform (DFT)-spread OFDM signal to compensate for high peak-to-average power ratio (PAPR).

Figure 2:
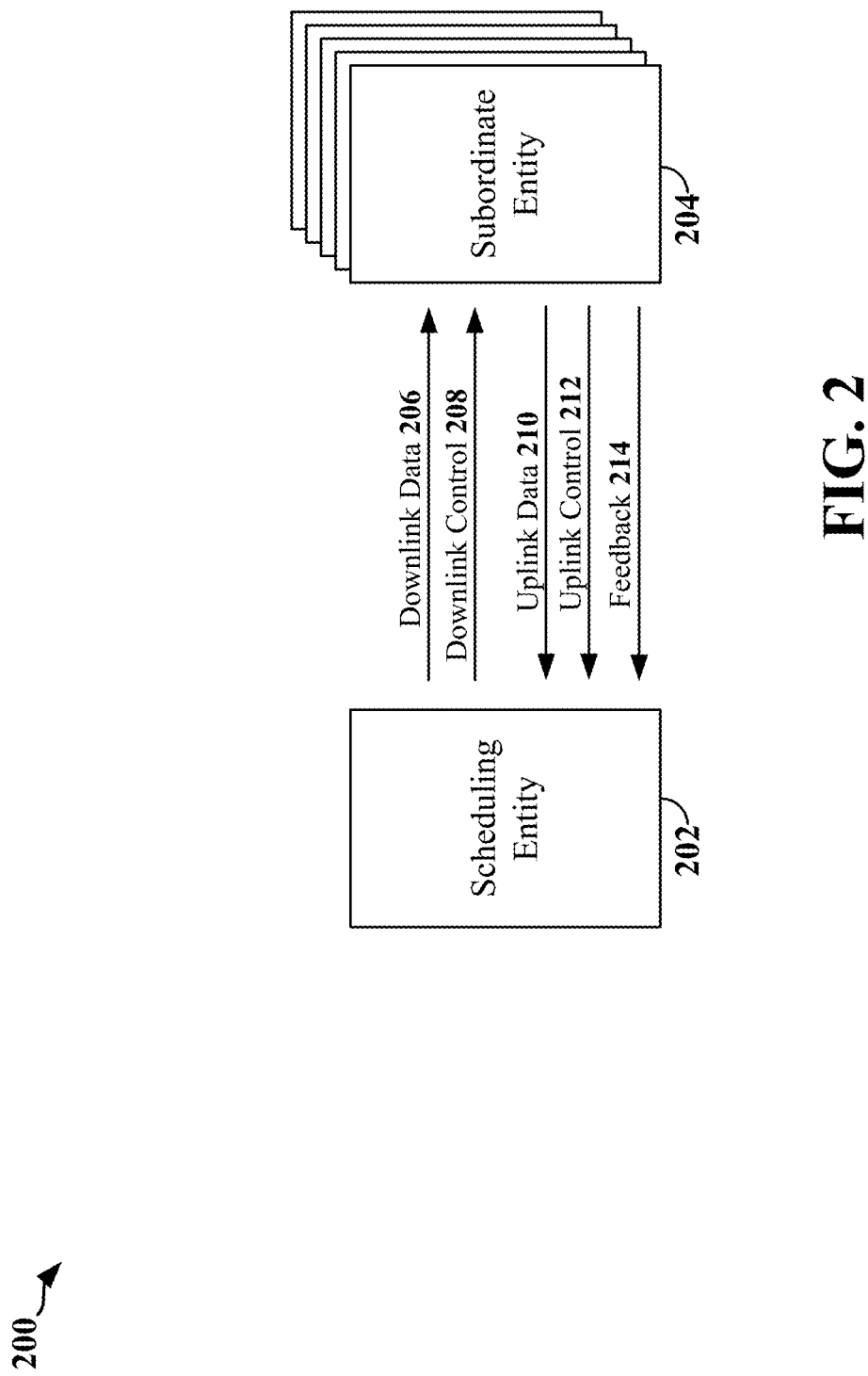
FIG. 2 is a block diagram illustrating a scheduling entity and a plurality of subordinate entities.

In various aspects of the present disclosure, the base stations 104 and 108 described above need not necessarily be utilized at any given time. That is, in a peer-to-peer, device-to-device, or mesh configuration any suitable node including the UE 106 may perform as a scheduling entity, scheduling the use of air interface resources for one or more other devices, acting as subordinate or scheduled entities. Referring now to FIG. 2, a block diagram illustrates a scheduling entity 202 communicating with a plurality of subordinate entities 204. Here, the scheduling entity 202 may correspond to the base stations 104 and 108. In additional examples, the scheduling entity 202 may correspond to the UE 106 or any other suitable node in the access network 100. Similarly, in various examples, the subordinate entity 204 may correspond to the UE 106, a base station 104/108, or any other suitable node in the access network 100.

As illustrated in FIG. 2, the scheduling entity 202 may broadcast downlink data 206 to one or more subordinate entities 204. In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the scheme may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network, such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded, i.e., the shortest decodable transmission of information. In various examples, TTIs may correspond to frames, to subframes, to data blocks, time slots, or other suitable groupings of bits for transmission.

The subordinate entities 204 may transmit a feedback channel 214 to the scheduling entity 202. The feedback channel 214 may in some examples include a request for the scheduling entity 202 to schedule uplink transmissions. Here, in response to the request transmitted on the feedback channel 214, the scheduling entity 202 may transmit in the control channel 208 information that may schedule the TTI with uplink packets. In a further example, the feedback channel 214 may include information about interference experienced at the subordinate entity 204, which the scheduling entity 202 may utilize dynamically to modify downlink transmissions in a way that may make further downlink transmissions more robust to the interference. In an aspect of the present disclosure, the feedback channel 214 may include Hybrid Automatic Repeat Request (HARQ) feedback information.

The channels illustrated in FIG. 2 are not necessarily all of the channels that may be utilized between a scheduling entity 202 and the subordinate entities 204, and those of ordinary skill in the art will recognize that other channels may be utilized in addition to those illustrated, such as other control and feedback channels.

In the context of a multiple access network, channel resources may be scheduled, and each entity may be synchronous. That is, each node utilizing the network may coordinate its usage of the resources such that transmissions are only made in the allocated portion of a radio frame, and the time of each allocated portion is synchronized among the different nodes.

Figure 3:
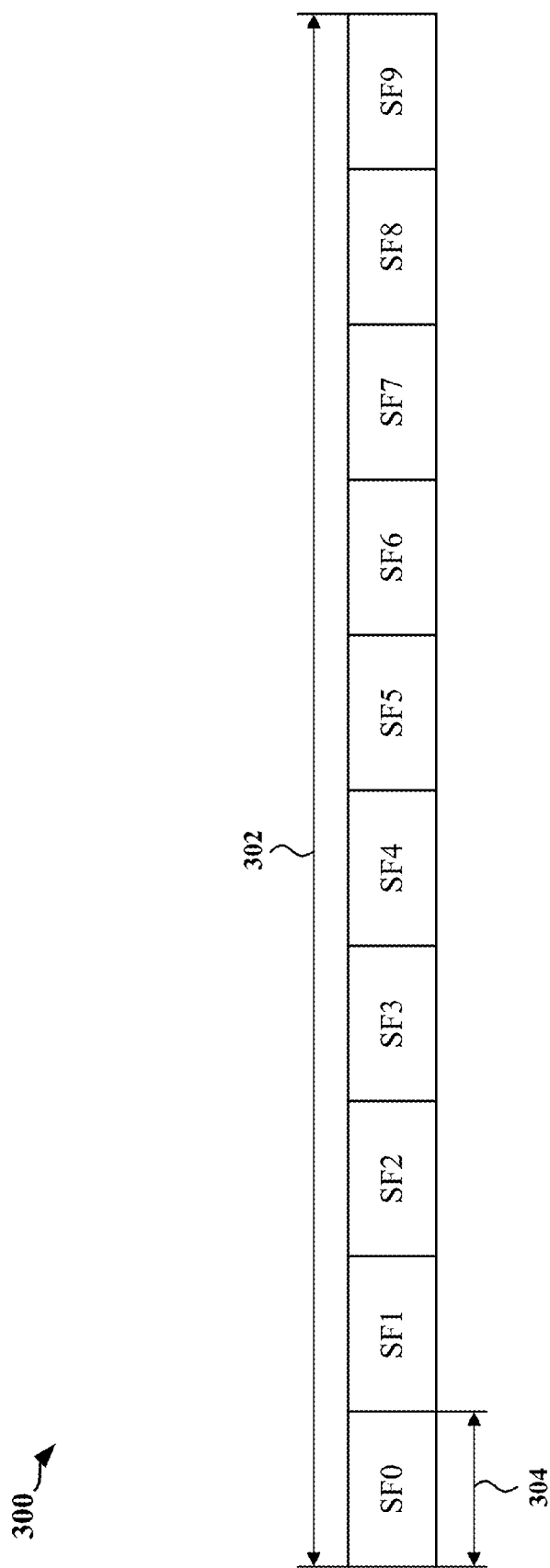
FIG. 3 illustrates a radio frame for wireless communication between the scheduling entity and the subordinate entity.

FIG. 3 illustrates an example of a TDD radio frame structure 300 that may be used for wireless communication between the scheduling entity 202 and the subordinate entity 204. In an aspect of the present disclosure, the radio frame 300 may have a time period 302. For example, the time period 302 may be 5 ms. Further, the radio frame 300 may include one or more subframes (SFs). In the example configuration of FIG. 3, the radio frame 300 includes 10 subframes (e.g., labeled "SF0" to "SF9" in FIG. 3) that have the same time period 304. For example, the time period 304 may be 500 μs. However, within the scope of the present disclosure, a frame may include any suitable number of subframes, and each subframe may have any suitable time period. In some aspects of the present disclosure, one or more of the subframes SF0 to SF9 may be self-contained subframes, described below with reference to the examples in FIGS. 4A and 4B.

Figure 4A:
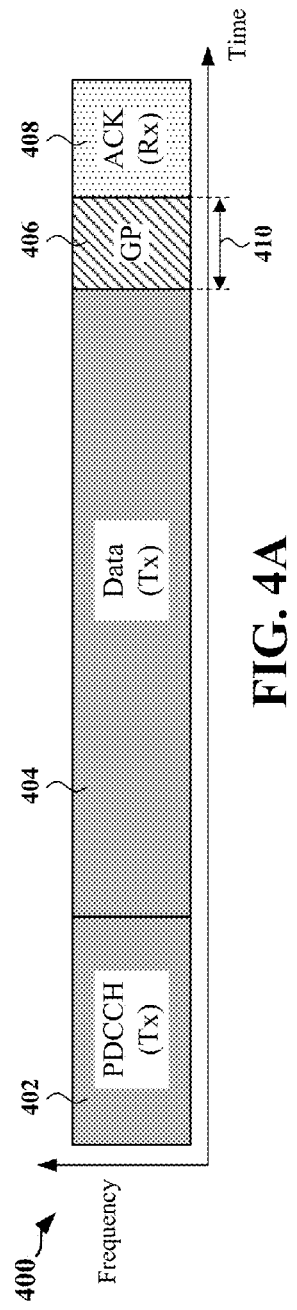
FIG. 4 (including FIGS. 4A and 4B) illustrates example structures of self-contained subframes in accordance with various aspects of the present disclosure.

FIG. 4A illustrates one example structure of a self-contained TDD subframe 400. In the example of FIG. 4A, a subframe may be a transmitter-scheduled subframe, referred to herein as a downlink-centric subframe or DL-centric subframe, as more resources are allocated for transmissions in the downlink direction (e.g., transmissions from the scheduling entity 202 to the subordinate entity 204). Each subframe, such as subframe 300 in FIG. 3, may include transmit (Tx) and receive (Rx) portions. For example, in the DL-centric subframe 400, the scheduling entity 202 first has an opportunity to transmit control information, e.g., on a physical downlink control channel (PDCCH), in the control information portion 402, and then an opportunity to transmit data information, e.g., on a physical downlink shared channel (PDSCH), in the DL-centric data portion 404. Following a guard period (GP) portion 406 having a suitable time period 410, the scheduling entity 202 has an opportunity to receive an acknowledgment (ACK)/negative acknowledgment (NACK) signal in the ACK portion 408 from other entities using the carrier. Here, a subframe such as the DL-centric subframe 400 may be referred to as a self-contained subframe when all of the data carried in the data portion 404 of the DL-centric subframe 400 is scheduled in the control portion 402 of the subframe, and further, when all of the data carried in the data portion 404 of the subframe 400 is acknowledged (or at least has an opportunity to be acknowledged) in the ACK portion 408 of the DL-centric subframe 400. In this way, each self-contained subframe may be considered a self-contained entity, not necessarily requiring any other subframe to complete a scheduling-transmission-acknowledgment cycle for any given packet.

The GP portion 406 may be included to accommodate variability in UL and DL timing. For example, latencies due to radio frequency (RF) antenna direction switching (e.g., from DL to UL) and transmission path latencies may cause the subordinate entity 204 to transmit early on the UL to match DL timing. Such early transmission may interfere with symbols received from the scheduling entity 202. Accordingly, the GP portion 406 may allow an amount of time after the DL data portion 404 to prevent interference, where the GP portion 406 provides an appropriate amount of time for the scheduling entity 202 to switch its RF antenna direction, an appropriate amount of time for the over-the-air (OTA) transmission, and an appropriate amount of time for ACK processing by the subordinate entity 204.

Therefore, the GP portion 406 provides an appropriate amount of time for the subordinate entity 204 to switch its RF antenna direction (e.g., from DL to UL), to processes the data payload, and for the OTA transmission time. The time period 410 of the GP portion 406 may be configured in terms of full symbol periods. For example, the GP portion 406 may have a time period 410 of one full symbol period (e.g., 31.25 µs).

Figure 4B:
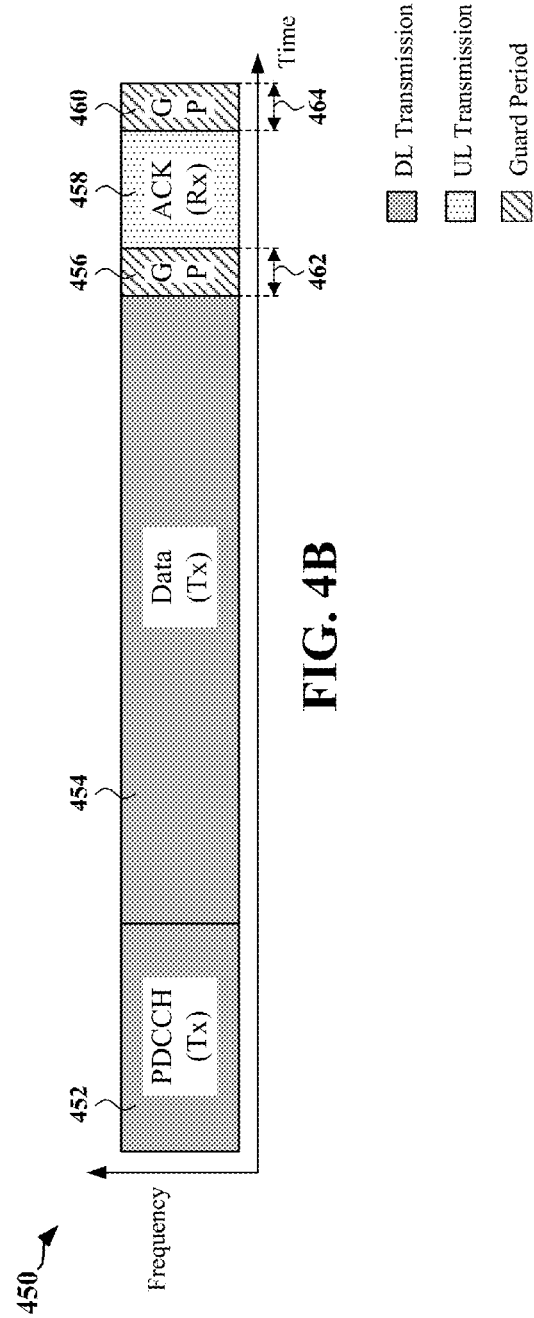

FIG. 4B illustrates another example structure of a self-contained subframe 450 (also referred to as DL-centric subframe 450). As seen, the structure of the DL-centric subframe 450 is essentially the same as that of the DL-centric subframe 400 illustrated in FIG. 4A and described above, except for a timing advance (TA) command has been applied to the UL waveform (e.g., the ACK portion 458). With reference to the DL-centric subframe 450, the scheduling entity 202 first has an opportunity to transmit control information in the control information portion 452, and then an opportunity to transmit data information in the DL data portion 454. Following the first GP portion 456, the scheduling entity 202 has an opportunity to receive an ACK/NACK signal in the ACK portion 458 from other entities (e.g., the subordinate entity 204) using the carrier. A second GP portion 460 is subsequent to the ACK portion 458.

A timing advance (TA) command may be transmitted from the scheduling entity 202 to the subordinate entity 204 in order to correct the timing of the subordinate entity 204 relative to a current timing of the subordinate entity 204. For example, in response to a TA command, the subordinate entity 204 may delay its timing (e.g., transmit later relative to the current timing of the subordinate entity 204) or advance its timing (e.g., transmit earlier relative to the current timing of the subordinate entity 204) to compensate for a propagation delay between the scheduling entity 202 and the subordinate entity 204. Therefore, in the example configuration of DL-centric subframe 450 in FIG. 4B, a TA command has advanced the timing of the subordinate entity 204 such that the ACK portion 458 (e.g., UL portion) of the subframe is configured earlier relative to its current timing. As such, the time period 462 of the first GP portion 456 in FIG. 4B is reduced relative to the time period 410 of the GP portion 406 in FIG. 4A (e.g., where no TA command is applied). In the example configuration of the DL-centric subframe 450 in FIG. 4B, the period remaining in the DL-centric subframe 450 subsequent to the ACK portion 458 is allocated as a guard period (e.g., the second GP portion 460). Accordingly, the time period 462 of the first GP portion 456 and the time period 464 of the second GP portion 460 may each be less than one full symbol period.

One consequence of the timing advance illustrated in FIG. 4B is a compression of the processing timeline for calculating the acknowledgment information for transmission in the ACK portion 458. That is, the receiving subordinate entity 204 may apply a suitable error checking algorithm to packets received in the data portion 454, in order to determine whether to acknowledge or not those packets in the ACK portion 458. In order to timely process the data payload received during the DL data portion 454 to sustain stable throughput, the subordinate entity 204 will require sufficient processing time to generate the ACK symbols as the data payload is received. However, especially with the timing advance discussed above, since the time period of first GP portion 456 may be less than one symbol period, the subordinate entity 204 may not have sufficient time to process the data payload received during the last full symbol in the DL data portion 454.

The processing performed by the subordinate entity 204 for demodulating and/or decoding transmissions received from the scheduling entity 202 may not be uniform across the entirety of a self-contained subframe and may consume a substantial amount of power. For example, the demodulation and/or decoding performed by the subordinate entity 204 may become idle (e.g., not demodulating and/or decoding transmissions from the scheduling entity 202) during a short symbol (e.g., a symbol having a time period that is less than the time period of a full symbol) allocated for an ACK portion of a self-contained subframe and during a short GP (e.g., a GP having a time period that is less than the time period of a full symbol) for the scheduling entity 202. Accordingly, in such example, the subordinate entity 204 may be idle for a time period of approximately one full symbol period. The subordinate entity 204 may also be idle for a time period of approximately two full symbol periods during reception of pilot signals and/or control information in the first several symbols of a subsequent self-contained subframe. For example, assuming that a subsequent self-contained subframe includes 16 symbols, approximately three to five of the 16 symbols of a subsequent self-contained subframe may be idle for purposes of demodulation and/or decoding data.

Figure 5:
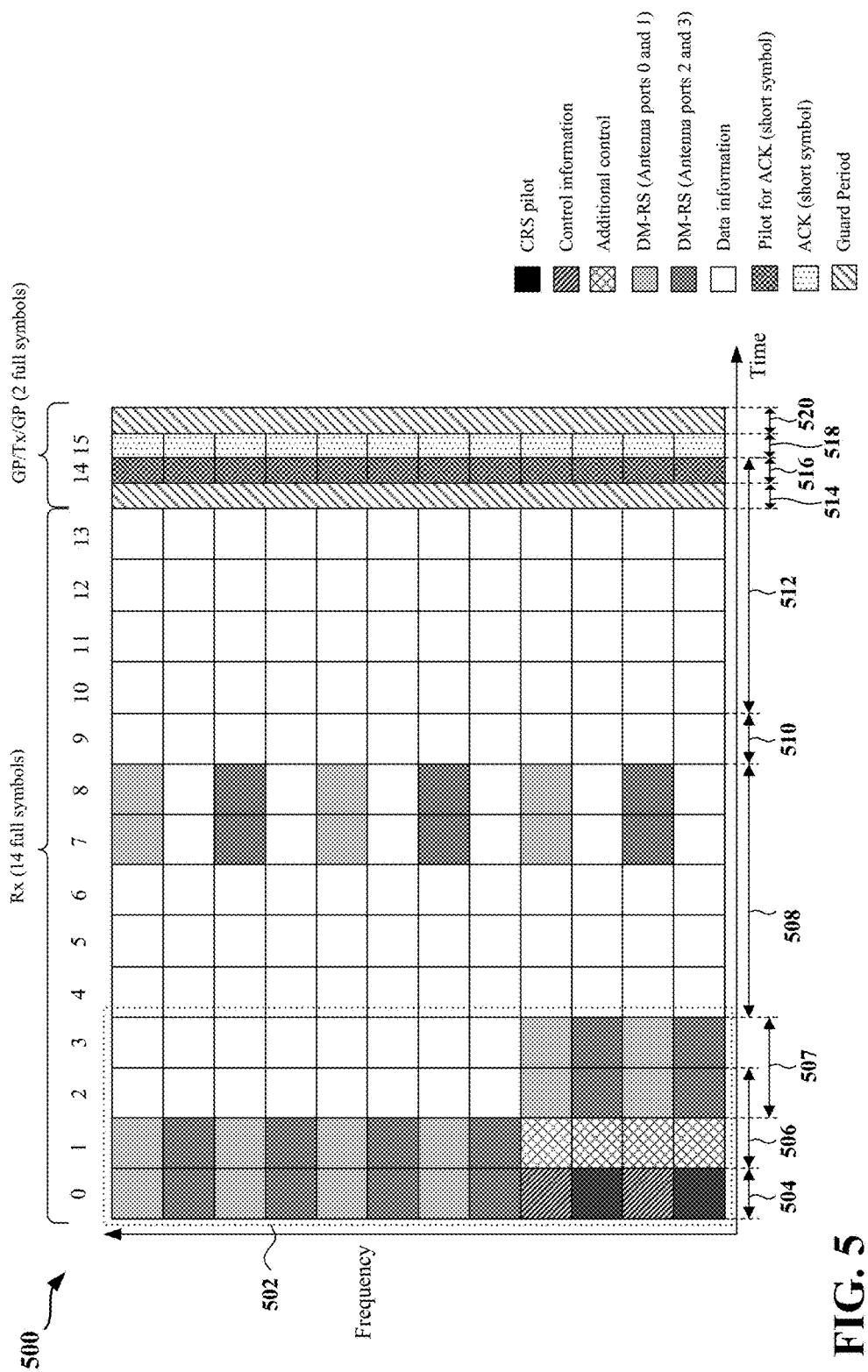
FIG. 5 is a diagram illustrating the structure of a self-contained subframe in accordance with various aspects of the present disclosure.

FIG. 5 is a diagram illustrating the structure of a self-contained subframe 500 (also referred to as DL-centric subframe 500) in accordance with various aspects of the present disclosure. As shown in FIG. 5, the DL-centric subframe 500 may have a time period of 16 full symbol periods. As further shown in FIG. 5, the symbols of the DL-centric subframe 500 may include cell-specific reference signal (CRS) pilots, demodulation reference signal (DM-RS) pilots, control information, additional control information, data information, a pilot signal for an ACK/NACK signal, and an ACK/NACK signal. As shown in the example configuration of FIG. 5, the DM-RS pilots may be transmitted using different sets of antenna ports (e.g., antenna ports 0 and 1, or antenna ports 2 and 3). An antenna port may represent a logical antenna configuration and may not necessarily refer to a physical antenna. For example, symbols that are transmitted via identical antenna ports may be subject to the same channel conditions.

For example, the subordinate entity 204 may process CRS and control information in the time period 506 of symbols 1 and 2, and may process DM-RS (excluding DM-RS pushed out into later symbols due to control information) in the time period 507 of symbols 2 and 3. The subordinate entity 204 may process data information received in symbols 2 to 6 during the time period 508 of symbols 4 to 8, may process data information received in symbols 7 and 8 in the time period 510 of symbol 9, and may process data information received in symbols 9 to 13 during the time period 512 of symbols 10 to short symbol 14. It should be noted that the time period 516 of the short symbol 14 and the time period 518 of the short symbol 15 may be less than the time period of a full symbol, such as the time period 504 of full symbol. In one example, the time periods 516 and 518 of the short symbols 14 and 15 may each be one half of the time period 504 of full symbol 0. In such example, the time periods 514 and 520 of the guard periods may each be one half of the time period 504 of full symbol 0.

In order to achieve fully pipelined processing of data received through the air interface from a scheduling entity (e.g., scheduling entity 202) and to maintain high performance, the DM-RS pilots are configured at the beginning (e.g., in symbols 0 through 3) of the DL-centric subframe 500 to enable channel estimation and demodulation pipelining. Furthermore, code blocks (CBs) containing data information are interleaved over the frequency domain (e.g., in symbols 4-6 and 9-13) so that the subordinate entity 204 may begin processing data prior to the end of the DL-centric subframe 500. In the example configuration of FIG. 5, since CRS, DM-RS, and/or control information processing are performed in region 502 (e.g., symbols 0-3) and ACK/NACK transmission is performed in short symbol 15, these symbols will be idle with respect to demodulation and decoding of code blocks. Therefore, in one example, although the TTI provided by the DL-centric subframe 500 has a time period of 16 full symbols, the subordinate entity 204 may be idle for five of the 16 symbols with respect to demodulation and/or decoding of code blocks. As such, in order to meet the ACK timeline requirements of the DL-centric subframe 500, the subordinate entity 204 should complete demodulation and/or decoding of code blocks received in the DL-centric subframe 500 within a time period of 11 full symbol periods (e.g., 16 full symbol periods−5 full (idle) symbol periods=11 full symbol periods).

In one example, the hardware and clock of the subordinate entity 204 may be configured such that demodulation and/or decoding of code blocks is performed by the subordinate entity 204 at close to full duty cycle over the entire DL-centric subframe 500. In one example, only a portion of all code blocks received in the DL-centric subframe 500 may be processed prior to the UL symbol (e.g., short symbol 15) in which an ACK/NACK signal should be transmitted. In such example, the subordinate entity 204 may implement a predictive ACK approach where the subordinate entity 204 may be configured to generate an ACK/NACK signal based on a cyclic redundancy check (CRC) (or based on whether decoding iterations converge to a valid codeword when a low-density parity-check (LDPC) is implemented by the subordinate entity 204) of code blocks that the subordinate entity 204 was able to process (e.g., demodulate and/or decode) prior to the UL symbol (e.g., short symbol 15) in which an ACK/NACK signal is to be transmitted. For example, the subordinate entity 204 may determine that each of the code blocks that the subordinate entity 204 was able to process prior to the UL symbol in which an ACK/NACK signal needs to be transmitted has passed CRC. In such example, the subordinate entity 204 may transmit an ACK signal to the scheduling entity 202 for the transmission of code blocks received in the DL-centric subframe 500 despite any remaining code blocks (e.g., a code block received in symbol 13) that have not been processed by the subordinate entity 204.

In another example, if the subordinate entity 204 determines that one or more of the code blocks processed by the subordinate entity 204 has not passed CRC, the subordinate entity 204 may transmit a NACK to the scheduling entity 202. In another example, the subordinate entity 204 may process (e.g., decode) n code blocks from among a total of N code blocks transmitted to the subordinate entity in the DL-centric subframe 500, where n<N. The subordinate entity 204 may then determine a number of the decoded n code blocks that are successfully decoded (e.g., have passed a CRC) and may determine to transmit an ACK signal when the number of the decoded n code blocks meets or exceeds a threshold value, which may avoid triggering a physical (PHY) layer retransmission and may instead trigger a media access control (MAC) layer (also referred to as MAC level) retransmission based on a MAC layer forward error correction (FEC). Therefore, in a subsequent transmission, the scheduling entity 202 may transmit new code blocks with parity code blocks to the subordinate entity 204, where the parity code blocks may enable recovery of one or more lost code blocks in previous subframes.

It should be noted that the predictive ACK approach discussed above maintains the TDD timeline for the DL-centric subframe 500 with respect to a HARQ Log-Likelihood Ratio (LLR) buffer reduction. The predictive ACK approach may be successfully implemented because, in most scenarios, if all decoded code blocks of a transmission received in a self-contained subframe pass CRC, the remaining code blocks of the transmission not yet decoded are also likely to pass CRC. This may be due to negligible Doppler shifts and high correlation of interference within one self-contained subframe. When sporadic CRC failures occur in the remaining code blocks of a transmission received in a self-contained subframe, the MAC layer UL control reports the number of code blocks required to recover the failed code blocks along with new code blocks containing new data information. For example, and as discussed in detail below, the subordinate entity 204 may report, to the scheduling entity 202, the number of code blocks that were not successfully decoded by the subordinate entity 204 and may receive a second transmission from the scheduling entity 202 in a subsequent subframe that includes parity code blocks for recovering the code blocks that were not successfully decoded. For example, the subordinate entity 204 may implement a MAC layer FEC based on the parity code blocks to recover the code blocks that were not successfully decoded. It should be noted that the predictive ACK approach does not require an increase in the HARQ buffer size. In one example, the MAC layer HARQ may be triggered when a small number of code blocks fail CRC, which is more efficient than a physical layer (PHY) transport block level HARQ.

Figure 6:
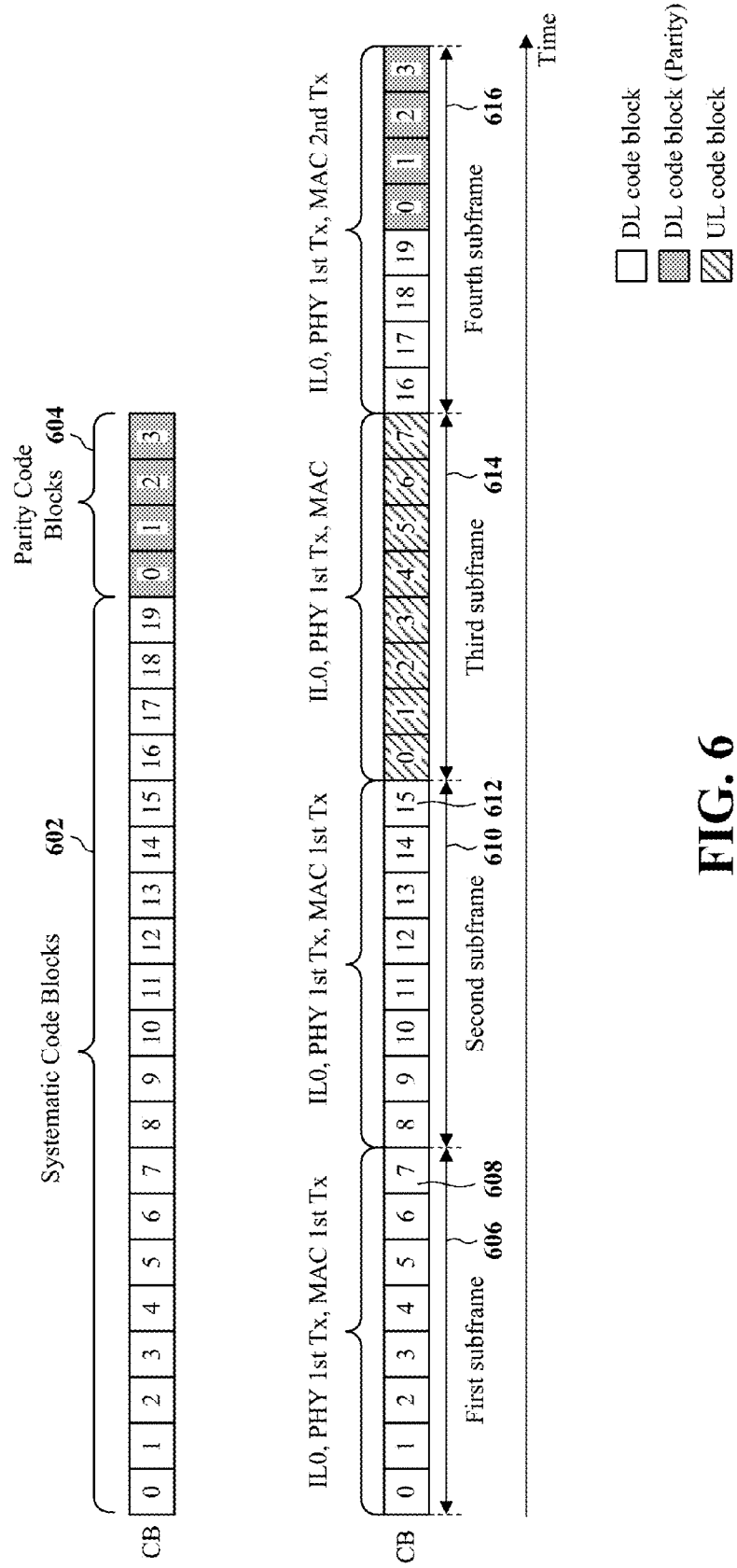
FIG. 6 is a diagram illustrating code block decoding in a subordinate entity using a self-contained subframe in accordance with various aspects of the present disclosure.

FIG. 6 is a diagram illustrating an example of code block decoding in a subordinate entity (e.g., the subordinate entity 204) using a self-contained subframe (e.g., the DL-centric subframe 400, 500) in accordance with various aspects of the present disclosure. In the example of FIG. 6, the scheduling entity 202 may configure a set of systematic code blocks 602 (e.g., code blocks 0 to 19) to be transmitted to the subordinate entity 204. In the present disclosure, a set of systematic code blocks may refer to a set of code blocks that includes parity code blocks for recovering code blocks that were not successfully decoded. The subordinate entity 204 may receive the code blocks in a number of self-contained subframes (e.g., the first subframe 606, the second subframe 610, and the fourth subframe 616). For example, in the first subframe 606, the subordinate entity 204 may receive a transport block that includes the code blocks 0 to 7 (e.g., code blocks 0 to 7 from the set of systematic code blocks 602). The subordinate entity 204 may complete processing (e.g., demodulate and decode) of code blocks 0 to 6, however, the subordinate entity 204 may not have sufficient time to process code block 7 (e.g., the code block 608 in FIG. 6) included in the last few symbols of the first subframe 606 prior to transmission of the ACK/NACK signal in the first subframe 606. In such case, the subordinate entity may transmit an ACK/NACK signal based on the code blocks 0 to 6. For example, the subordinate entity 204 may transmit an ACK signal (also referred to as a predictive ACK signal) if the code blocks 0 to 6 pass CRC. In the second subframe 610, the subordinate entity 204 may receive another transport block that includes code blocks 8 to 15 (e.g., code blocks 8 to 15 from the set of systematic code blocks 602). The subordinate entity 204 may process (e.g., demodulate and decode) code blocks 8 to 14, however, the subordinate entity 204 may not have sufficient time to process code block 15 (e.g., the code block 612 in FIG. 6) included in the last few symbols of the second subframe 610 prior to transmission of the ACK/NACK signal in the second subframe 610. In such case, the subordinate entity 204 may transmit an ACK/NACK signal based on the code blocks 8 to 14. For example, the subordinate entity 204 may transmit an ACK signal (also referred to as a predictive ACK signal) if code blocks 8 to 14 pass CRC. Therefore, in one aspect of the present disclosure, the predictive ACK signal may acknowledge a portion of the current subframe that has been processed by the subordinate entity 204 and may further acknowledge a portion of a previous subframe that was not processed at the time a previous ACK signal was transmitted.

The subordinate entity 204 may process code block 7 after transmitting the ACK/NACK signal in the first subframe 606 and may process code block 15 after transmitting the ACK/NACK signal in the second subframe 610 (extra buffering may be required to perform such processing). For example, the subordinate entity 204 may process a code block after transmitting an ACK/NACK signal during the previously discussed idle periods in a subsequent self-contained subframe. For example, the subordinate entity 204 may process code block 7 during an idle period in the second subframe 610.

If the subordinate entity 204 determines that code block 7 and/or code block 15 does not pass CRC and an ACK signal for each of these code blocks has already been transmitted, the subordinate entity 204 may provide feedback in a subsequent subframe (e.g., the third subframe 614 in FIG. 6) to initiate a MAC level HARQ. The feedback may indicate the number of code blocks (e.g., two code blocks) that did not pass CRC. For example, the subordinate entity 204 may transmit the feedback in the third subframe 614 along with new data code blocks (e.g., code blocks 0 to 7). The MAC level HARQ may form a new physical layer transport block, and parities of all the code blocks (as systematic packets to the code) or part of the code blocks (e.g., for code blocks not processed by the subordinate entity 204 at the time an ACK signal was transmitted). The MAC level HARQ may also combine code block failures in multiple transport blocks and retransmit code blocks that include extra parities, such as the parity code blocks 604. Therefore, multiple transport block retransmissions may be combined within one transport block. For example, the scheduling entity 202 may transmit a transport block that includes code blocks 16-19 (e.g., code blocks 16 to 19 from the set of systematic code blocks 602) and parity code blocks 0-3 (e.g., parity code blocks 0-3 from the parity code blocks 604). The parity code blocks provide built-in robustness against bursty inference and/or puncturing. Although a latency may be introduced due to a MAC level HARQ delay, the LLR memory does not need to be increased. In the example of FIG. 6, upon receiving the parity code blocks 0 to 3, the subordinate entity 204 may implement MAC layer FEC to recover the code blocks (e.g., code block 7 and/or code block 15) that did not pass CRC to gain processing time and to ensure pipelining. Therefore, by implementing MAC layer FEC, it should be noted that the subordinate entity 204 may recover one or more code blocks without receiving a physical layer retransmission of any failed or lost code blocks (e.g., code block 7 and/or code block 15) from the scheduling entity 202.

Figure 7:
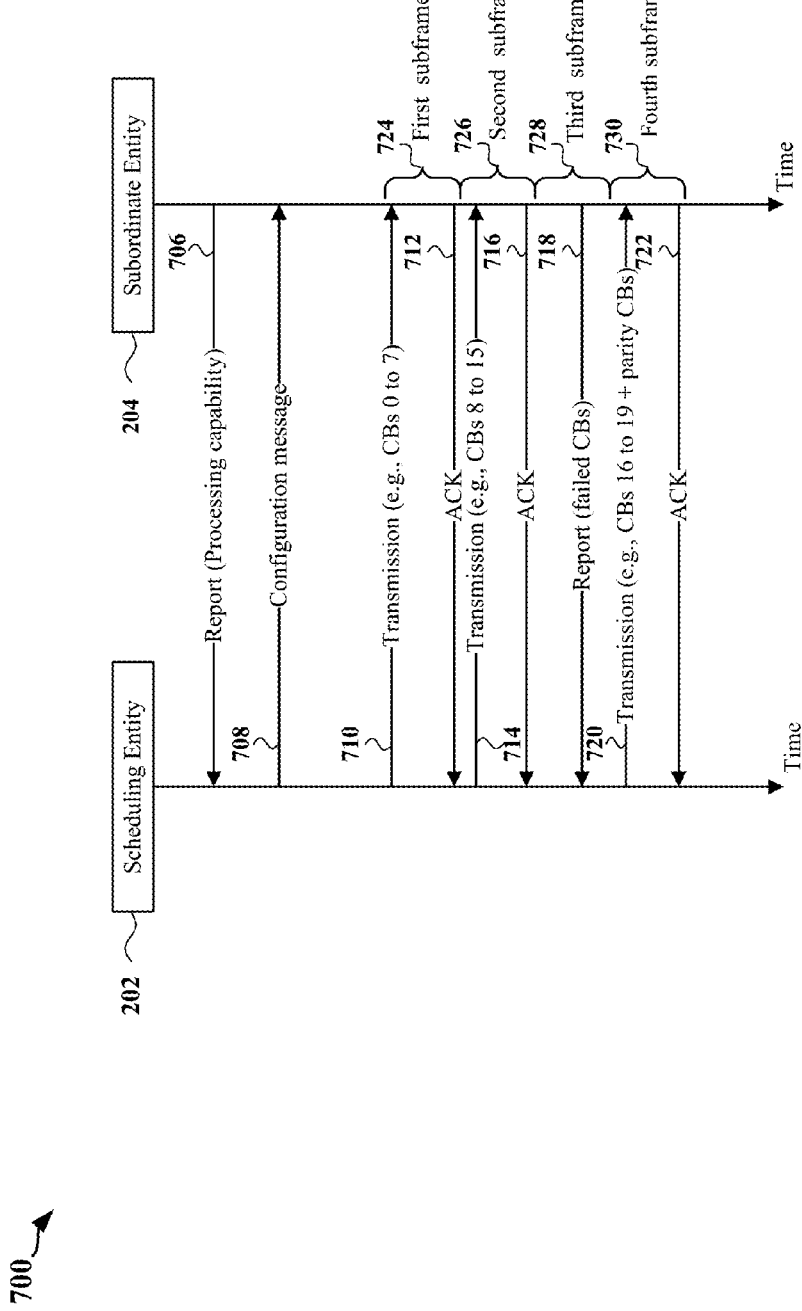
FIG. 7 is a diagram illustrating a message flow between a scheduling entity and a subordinate entity in accordance with various aspects of the present disclosure.

FIG. 7 is a diagram illustrating an example message flow 700 between a scheduling entity (e.g., scheduling entity 202) and a subordinate entity (e.g., subordinate entity 204) in accordance with various aspects of the present disclosure. As shown in FIG. 7, the subordinate entity 204 may transmit a report 706 to the scheduling entity 202 including a processing capability of the subordinate entity 204. The scheduling entity 202 may transmit a configuration message 708 to the subordinate entity 204 based on the processing capability of the subordinate entity 204. For example, if the processing capability indicates that the subordinate entity 204 may not be able to complete processing of code blocks (e.g., code blocks including data information) in a self-contained subframe and transmit an ACK signal within a self-contained subframe, the configuration message 708 may enable the subordinate entity 204 to transmit an ACK signal (also referred to as a predictive ACK signal) before the processing of the code blocks received in a self-contained subframe is completed.

The scheduling entity 202 may then proceed to transmit a first transmission 710 to the subordinate entity 204 in a first self-contained subframe 724. For example, the first transmission 710 may include the code blocks 0 to 7 previously discussed with respect to FIG. 6. The subordinate entity 204 may process a portion (e.g., code blocks 0 to 6) of the first transmission 710 and may determine whether to transmit an ACK signal for the first transmission 710 in an ACK portion of the first self-contained subframe 724 before a remaining part (e.g., code block 7) of the first transmission 710 is processed. For example, the subordinate entity 204 may decode code blocks 0 to 6 and may determine a number of the decoded code blocks 0 to 6 that have passed a CRC. The subordinate entity 204 may determine to transmit an ACK signal for the first transmission 710 when the number meets or exceeds a threshold value. For example, the threshold value may be an integer, such as four or eight. If an adequate number (e.g., a number that meets or exceeds the threshold value) of decoded code blocks have passed CRC, the subordinate entity 204 may transmit a first ACK signal 712 for the first transmission 710 in an ACK portion of the first self-contained subframe 724.

The scheduling entity 202 may then proceed to transmit a second transmission 714 to the subordinate entity 204 in a second self-contained subframe 726. For example, the second transmission 714 may include the code blocks 8 to 15 previously discussed with respect to FIG. 6. The subordinate entity 204 may process a portion (e.g., code blocks 8 to 14) of the second transmission 714 and may determine whether to transmit an ACK signal for the second transmission 714 in an ACK portion of the second self-contained subframe 726 before a remaining part (e.g., code block 15) of the second transmission 714 is processed. For example, the subordinate entity 204 may decode code blocks 8 to 14 and may determine a number of the decoded code blocks 8 to 14 that have passed a CRC. The subordinate entity 204 may determine to transmit an ACK signal for the second transmission 714 when the number meets or exceeds a threshold value. For example, the threshold value may be an integer, such as four or eight. If an adequate number (e.g., a number that meets or exceeds the threshold value) of decoded code blocks have passed CRC, the subordinate entity 204 may transmit a second ACK signal 716 for the second transmission 714 in an ACK portion of the second self-contained subframe 726. In an aspect of the present disclosure, the ACK signal for the second transmission 714 may also serve as an acknowledgment for the last code block (e.g., code block 7) processed in the previous self-contained subframe (e.g., first self-contained subframe 724).

The subordinate entity 204 may process the remaining part (e.g., code block 7) of the first transmission 710 during an idle period in the second self-contained subframe 726 and may process the remaining part (e.g., code block 15) of the second transmission 714 during an idle period in the third self-contained subframe 728. The subordinate entity 204 may then transmit a report (e.g., a MAC layer acknowledgment) 718 to the scheduling entity 202. The report 718 may indicate the number of code blocks (e.g., the number two for code blocks 7 and 15) that were not successfully decoded by the subordinate entity 204.

The scheduling entity 202 may transmit a third transmission 720 to the subordinate entity 204 in a fourth self-contained subframe 730. For example, the third transmission 720 may include the code blocks 16 to 19 and parity code blocks (e.g., parity code blocks 604 previously discussed with respect to FIG. 6). The subordinate entity 204 may then proceed to recover the code blocks 7 and 15 using a MAC layer FEC based on the parity code blocks. The subordinate entity 204 may determine to transmit an ACK signal for the third transmission 722 in an ACK portion of the fourth self-contained subframe 730 in a manner similar to the previously described approaches and may transmit a third ACK signal 722 for the third transmission 720 in the ACK portion of the fourth self-contained subframe 730.

Figure 8:
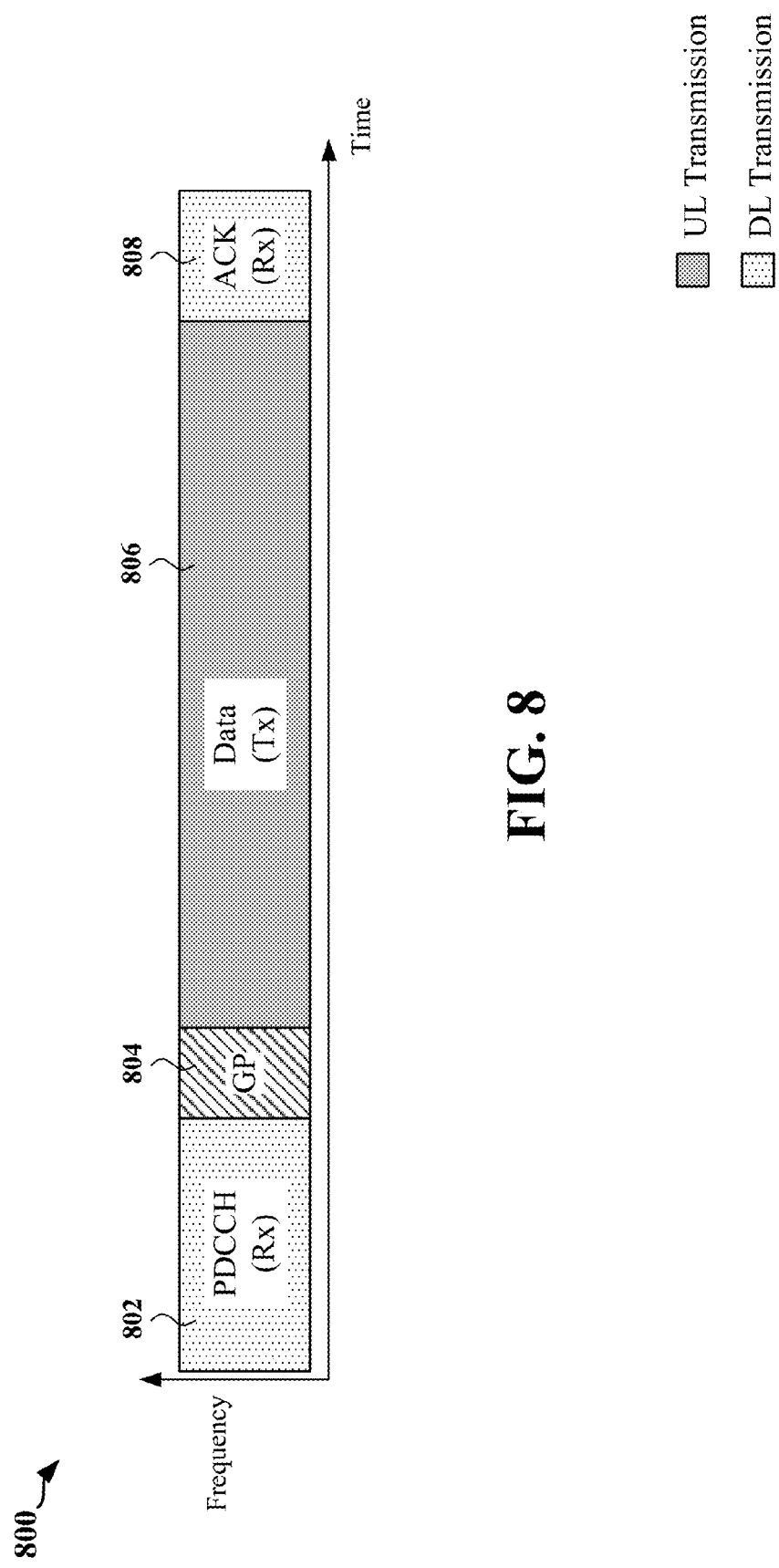
FIG. 8 illustrates the structure of self-contained subframe in accordance with various aspects of the present disclosure.

FIG. 8 illustrates an example structure of self-contained subframe 800 in accordance with various aspects of the present disclosure. The self-contained subframe 800 is a UL-centric subframe and may be used to receive control data from the scheduling entity 202, transmit data information to a scheduling entity 202, and receive an ACK/NACK signal for the transmitted data information from the subordinate entity 204. In the self-contained subframe 800, the subordinate entity 204 first has an opportunity to receive control information in the control information portion 802. Following a GP portion 804, the subordinate entity 204 has an opportunity to transmit data information in the UL data portion 806. The subordinate entity 204 subsequently has an opportunity to receive an ACK/NACK signal in the ACK portion 808 from the scheduling entity 202 using the carrier.

Similar to the previously discussed aspects of the subordinate entity 202, the scheduling entity 204 may implement a predictive ACK approach where the scheduling entity 204 may generate an ACK/NACK signal based on a CRC (or based on whether decoding iterations converge to a valid codeword when LDPC is implemented by the scheduling entity 202) of code blocks from the subordinate entity 204 that the scheduling entity 202 was able to process (e.g., demodulate and/or decode) prior to the ACK portion 808. In one aspect of the present disclosure, the predictive ACK signal from the scheduling entity 202 may acknowledge a portion of the current subframe that has been processed by the scheduling entity 202 and may further acknowledge a portion of a previous subframe that was not processed at the time a previous ACK signal was transmitted. In one example, the scheduling entity 202 may process (e.g., decode) n code blocks from among a total of N code blocks transmitted to the scheduling entity 202 in the self-contained subframe 800, where n<N. In such example, the scheduling entity 202 may determine a number of the decoded n code blocks that are successfully decoded (e.g., have passed a CRC) and may determine to transmit an ACK signal when the number of the decoded n code blocks meets or exceeds a threshold value, which may avoid triggering a PHY layer retransmission and may instead trigger a MAC layer retransmission based on a MAC layer FEC. Therefore, in a subsequent transmission, the subordinate entity 204 may transmit new code blocks with parity code blocks to the scheduling entity 202, where the parity code blocks may enable recovery of one or more lost code blocks in previous subframes.

It should be noted that the example subframe structure of FIG. 8 is UL-centric, as more resources are allocated for transmissions in the uplink direction (e.g., transmissions from the subordinate entity 204 to the scheduling entity 202). Accordingly, UL data processing at the scheduling entity 202 may be amortized over the entire self-contained subframe 800. For example, instead of remaining idle with respect to processing code blocks (e.g., decode UL data information) in the DL portion 802, the ACK portion 808, and part of the GP portion 804, the scheduling entity 202 may use the DL portion 802, the ACK portion 808, and/or part of the GP portion 804 to process code blocks containing data information. The UL code blocks may include multiple users (e.g., multiple subordinate entities) and up to a high order of multi-user MIMO. Therefore, by implementing the previously discussed predictive ACK and MAC coding/HARQ approach in the self-contained subframe 800, the processing timeline for the scheduling entity 202 may be relaxed. This may enable a reduction of the hardware clock rate of the scheduling entity 202 by a fraction as compared to the typical rate, and may enable a reduction of the operating voltage level of the scheduling entity 202.

Therefore, MAC level coding and HARQ may provide area saving (e.g., amount and size of hardware configured for processing code blocks) at the subordinate entity 204 (or scheduling entity 202) and/or power saving at the subordinate entity 204 (or scheduling entity 202). For example, by transmitting a predictive ACK signal in a self-contained subframe before processing of all code blocks received in self-contained subframe is completed, the subordinate entity 204 may use the idle periods in a subsequent self-contained subframe to complete processing of code blocks. Moreover, since the subordinate entity 204 may receive parity code blocks and may implement MAC layer FEC to recover any failed code blocks, physical layer retransmissions of the code blocks may be avoided to maintain the TDD timeline for the self-contained subframe. Therefore, the subordinate entity 204 may extend its processing capability across the entire self-contained subframe (e.g., the entire TTI) while processing (e.g., demodulating and decoding) the same amount of data information (e.g., the same number of code blocks). This may enable a reduction of the hardware clock rate of the subordinate entity 204 by a fraction as compared to the typical rate, and may enable a reduction of the operating voltage level of the subordinate entity 204 for additional power consumption savings.

The aspects described herein may be extended to more general HARQ processes with interlaces. For example, with contiguous DL centric self-contained subframes followed by contiguous UL centric self-contained subframes, DL processing may be clocked at a slow rate to stretch into the UL self-contained subframes to tradeoff latency for processing power/area. For example, with DL centric self-contained subframes followed by two UL centric subframes, UL ACK may be channelized on the second UL channel leaving more processing time for the DL subframe. The same approach may be applied to UL transmissions, where the scheduling entity may reduce the HARQ buffer size for each UE and the total number of UEs to be supported, and at the same time spread out hardware processing time evenly across the entire TTI.

Figure 9:
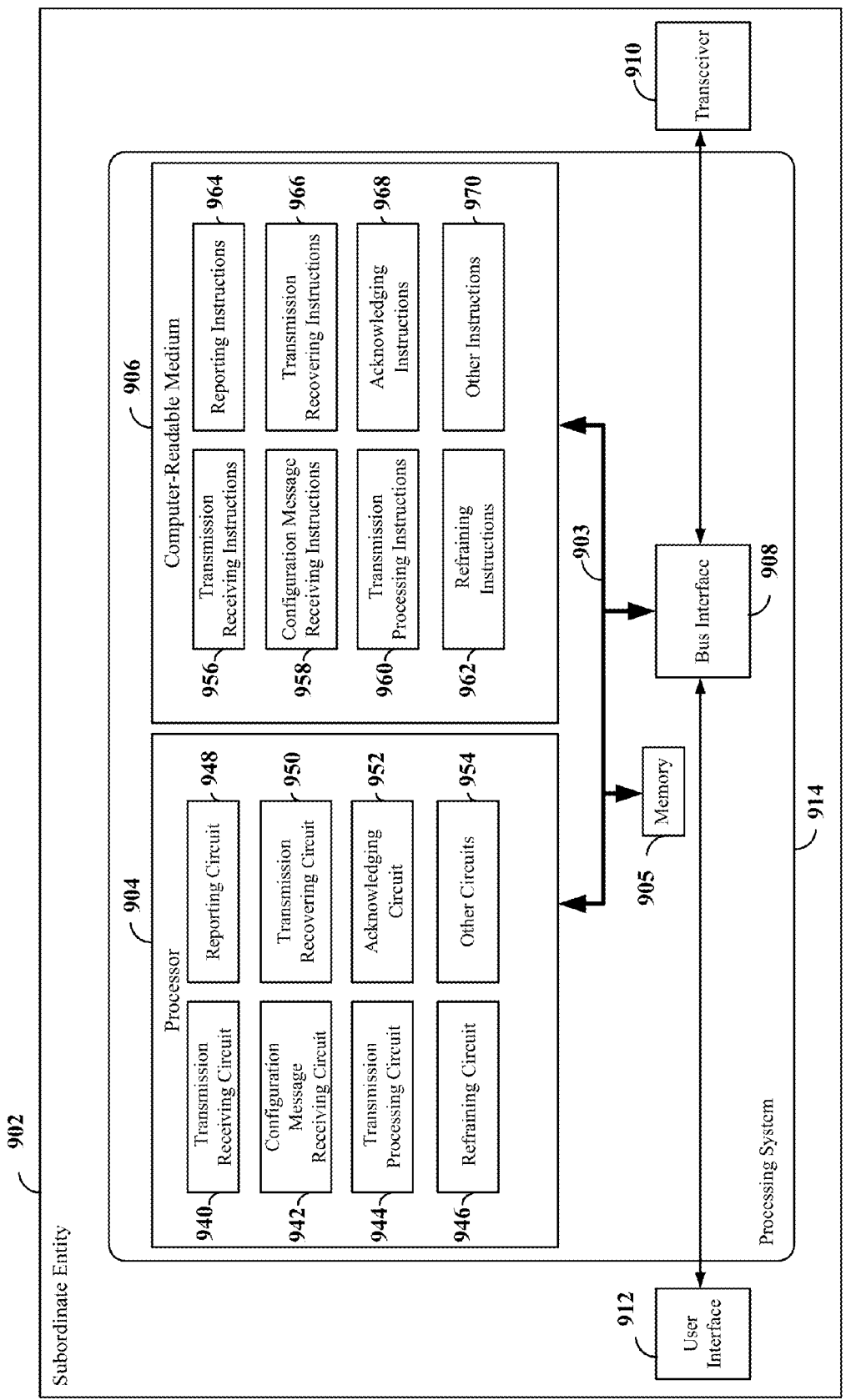
FIG. 9 is a diagram illustrating an example of a hardware implementation of an apparatus according to various aspects of the present disclosure.

FIG. 9 is a diagram illustrating an example of a hardware implementation of an apparatus 902 according to various aspects of the present disclosure. Generally, the apparatus 902 may be any device configured for wireless communication. In some configurations, the apparatus 902 may be the subordinate entity 204, as described in greater detail above. Further, in some configurations, the apparatus 902 may be a UE. Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, an Internet of Things device, a machine to machine (M2M) device, a device to device (D2D) device, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

The apparatus 902 may include a user interface 912. The user interface 912 may be configured to receive one or more inputs from a user of the apparatus 1502. The user interface 912 may also be configured to display information to the user of the apparatus 902. The user interface 912 may exchange data via the bus interface 908.

The apparatus 902 may also include a transceiver 910. The transceiver 910 may be configured to receive data and/or transmit data in communication with another apparatus. The transceiver 910 provides a means for communicating with another apparatus via a wired or wireless transmission medium. In some configurations, the transceiver 910 may provide the means for communicating with various other apparatus over a transmission medium. According to aspects of the present disclosure, the term(s) 'communicate' and/or 'communicating' refer to at least one of a transmission or a reception. In other words, without deviating from the scope of the present disclosure, the term(s) 'communicate' and/or 'communicating' may refer to a transmission without a simultaneous/concurrent reception, a reception without a simultaneous/concurrent transmission, and/or a transmission with a simultaneous/concurrent reception.

In some examples, the transceiver 910 may provide the apparatus 902 with the means for transmitting data (e.g., ACK signal, NACK signal, reports) to the scheduling entity 202 as well as the means for receiving data (e.g., data information in code blocks, configuration messages) from scheduling entity 202 (e.g., in a subframe). The transceiver 910 may be configured to perform such communications using various types of technologies, as described in greater detail above. One of ordinary skill in the art will understand that many types of technologies may perform such communication without deviating from the scope of the present disclosure.

The apparatus 902 may also include a memory 905, one or more processors 904, a computer-readable medium 906, and a bus interface 908. The bus interface 908 may provide an interface between a bus 903 and the transceiver 910. The memory 905, the one or more processors 904, the computer-readable medium 906, and the bus interface 908 may be connected together via the bus 903. The processor 904 may be communicatively coupled to the transceiver 910 and/or the memory 905.

The processor 904 may include a transmission receiving circuit 940. The transmission receiving circuit 940 may include various hardware components and/or may perform various algorithms that provide the means for receiving a transmission from the scheduling entity in a data portion of a subframe. The transmission receiving circuit 940 may further include various hardware components and/or may perform various algorithms that provide the means for receiving a second transmission from the scheduling entity in a subsequent subframe, the second transmission including parity code blocks associated with the one or more code blocks.

The processor 904 may also include a configuration message receiving circuit 942. The configuration message receiving circuit 942 may include various hardware components and/or may perform various algorithms that provide the means for receiving a configuration message from the scheduling entity based on the processing capability of the apparatus 902. In one example, the configuration message enables the apparatus 902 to transmit an ACK signal for the transmission before the remaining part of the transmission is processed.

The processor 904 may also include a transmission processing circuit 944. The transmission processing circuit 944 may include various hardware components and/or may perform various algorithms that provide the means for processing, in the subframe, at least a part of the transmission. The transmission processing circuit 944 may further include various hardware components and/or may perform various algorithms that provide the means for processing a remaining portion of the transmission after the ACK signal is transmitted to the scheduling entity 202.

The processor 904 may also include a refraining circuit 946. The refraining circuit 946 may include various hardware components and/or may perform various algorithms that provide the means for refraining from transmitting a NACK signal for the transmission when the at least a part of the transmission in the subframe is successfully processed and when the remaining part of the transmission has not been processed in the subframe. The refraining circuit 946 may further include various hardware components and/or may perform various algorithms that provide the means for refraining from requesting a physical layer retransmission for the transmission when the remaining part of the transmission has not been processed in the subframe.

The processor 904 may also include a reporting circuit 948. The refraining circuit 948 may include various hardware components and/or may perform various algorithms that provide the means for transmitting a report to the scheduling entity 202 including a processing capability of the apparatus 902. The reporting circuit 948 may further include various hardware components and/or may perform various algorithms that provide the means for reporting, to the scheduling entity 202, one or more code blocks in the transmission that were not successfully decoded by the apparatus 902.

The processor 904 may also include a transmission recovering circuit 950. The transmission recovering circuit 950 may include various hardware components and/or may perform various algorithms that provide the means for recovering the one or more code blocks using a MAC layer FEC based on the parity code blocks.

The processor 904 may also include an acknowledging circuit 952. The acknowledging circuit 952 may include various hardware components and/or may perform various algorithms that provide the means for determining whether to transmit an ACK signal for the transmission, the ACK signal to be transmitted in an ACK portion of the subframe before a remaining part of the transmission is processed, the data portion and the ACK portion being contained in the subframe. The acknowledging circuit 952 may further include various hardware components and/or may perform various algorithms that provide the means for transmitting the ACK signal to the scheduling entity 202 in the ACK portion of the subframe based on the determination.

The foregoing description provides a non-limiting example of the processor 904 of the apparatus 902. Although various circuits 940, 942, 944, 946, 948, 950, and 952 are described above, one of ordinary skill in the art will understand that the processor 904 may also include various other circuits 954 that are in addition and/or alternative(s) to the aforementioned circuits 940, 942, 944, 946, 948, 950, and 952. Such other circuits 954 may provide the means for performing any one or more of the functions, methods, processes, features and/or aspects described herein.

The computer-readable medium 906 may include various computer-executable instructions. The computer-executable instructions may include computer-executable code configured to perform various functions and/or enable various aspects described herein. The computer-executable instructions may be executed by various hardware components (e.g., the processor 904 and/or any of its circuits 940, 942, 944, 946, 948, 950, and 952) of the apparatus 902. The computer-executable instructions may be a part of various software programs and/or software modules.

The computer-readable medium 906 may also include transmission receiving instructions 956. The transmission receiving instructions 956 may include computer-executable instructions configured for receiving a transmission from the scheduling entity 202 in a data portion of a subframe. The transmission receiving instructions 956 may further include computer-executable instructions configured for receiving a second transmission from the scheduling entity 202 in a subsequent subframe, the second transmission including parity code blocks associated with the one or more code blocks.

The computer-readable medium 906 may also include configuration message receiving instructions 958. The configuration message receiving instructions 958 may include computer-executable instructions configured for receiving a configuration message from the scheduling entity 202 based on the processing capability of the apparatus 902. In one example, the configuration message enables the apparatus 902 to transmit an ACK signal for the transmission before the remaining part of the transmission is processed.

The computer-readable medium 906 may also include transmission processing instructions 960. The transmission processing instructions 960 may include computer-executable instructions configured for processing, in the subframe, at least a part of the transmission. The transmission processing instructions 944 may further include computer-executable instructions configured for processing a remaining portion of the transmission after the ACK signal is transmitted to the scheduling entity 202.

The computer-readable medium 906 may also include refraining instructions 962. The refraining instructions 962 may include computer-executable instructions configured for refraining from transmitting a NACK signal for the transmission when the at least a part of the transmission in the subframe is successfully processed and when the remaining part of the transmission has not been processed in the subframe. The refraining instructions 962 may further include computer-executable instructions configured for refraining from requesting a physical layer retransmission for the transmission when the remaining part of the transmission has not been processed in the subframe.

The computer-readable medium 906 may also include reporting instructions 964. The reporting instructions 964 may include computer-executable instructions configured for transmitting a report to the scheduling entity including a processing capability of the apparatus 902. The reporting instructions 964 may further include computer-executable instructions configured for reporting, to the scheduling entity 202, one or more code blocks in the transmission that were not successfully decoded by the apparatus 902.

The computer-readable medium 906 may also include transmission recovering instructions 966. The transmission recovering instructions 966 may include computer-executable instructions configured for recovering the one or more code blocks using a MAC layer FEC based on the parity code blocks.

The computer-readable medium 906 may also include acknowledging instructions 968. The acknowledging instructions 968 may include computer-executable instructions configured for determining whether to transmit an ACK signal for the transmission, the ACK signal to be transmitted in an ACK portion of the subframe before a remaining part of the transmission is processed, the data portion and the ACK portion being contained in the subframe. The acknowledging instructions 968 may further include computer-executable instructions configured for transmitting the ACK signal to the scheduling entity 202 in the ACK portion of the subframe based on the determination.

The foregoing description provides a non-limiting example of the computer-readable medium 906 of the apparatus 902. Although various computer-executable instructions 956, 958, 960, 962, 964, 966, and 968 are described above, one of ordinary skill in the art will understand that the computer-readable medium 906 may also include various other computer-executable instructions 970 that are in addition and/or alternative(s) to the aforementioned computer-executable instructions 956, 958, 960, 962, 964, 966, and 968. Such other computer-executable instructions 970 may be configured for any one or more of the functions, methods, processes, features and/or aspects described herein.

The memory 905 may include various memory modules. The memory modules may be configured to store, and have read therefrom, various values and/or information by the processor 904, or any of its circuits 940, 942, 944, 946, 948, 950, and 952. The memory modules may also be configured to store, and have read therefrom, various values and/or information upon execution of the computer-executable code included in the computer-readable medium 906, or any of its instructions 956, 958, 960, 962, 964, 966, and 968. The foregoing description provides a non-limiting example of the memory 905 of the apparatus 902. Although various types of data of the memory 905 are described above, one of ordinary skill in the art will understand that the memory 905 may also include various other data that are in addition and/or alternative(s) to the aforementioned data. Such other data may be associated with any one or more of the functions, methods, processes, features and/or aspects described herein.

By way of example, an element, or any portion of an element, or any combination of elements may be implemented with a "processing system" (e.g., processing system 914) that includes one or more processors (e.g., processor 904). Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include random access memory (RAM), a read only memory (ROM), a programmable ROM (PROM), an erasable PROM (EPROM), an electrically erasable PROM (EEPROM), optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Figure 10A:
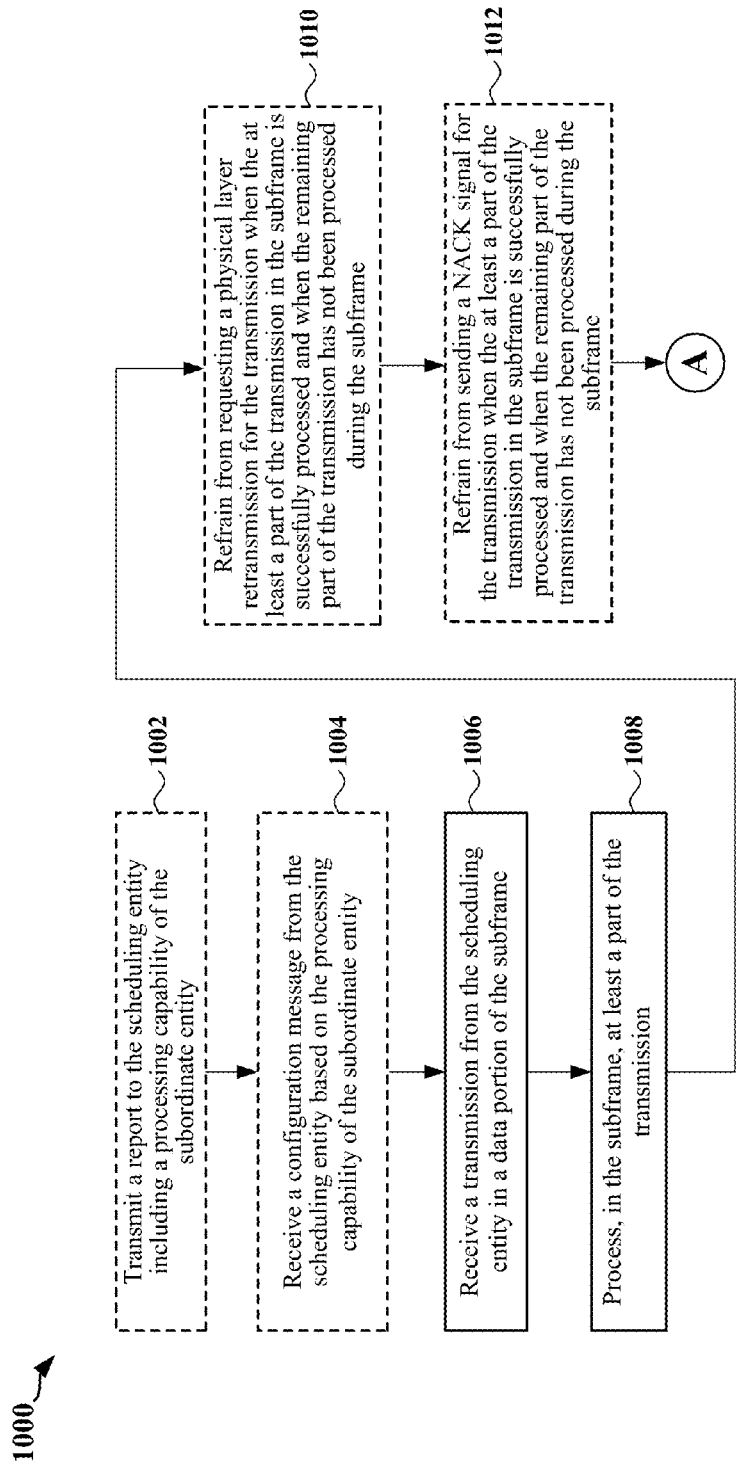
FIG. 10 (including FIGS. 10A and 10B) is a diagram illustrating an example of various methods and/or processes according to aspects of the present disclosure.
Figure 10B:
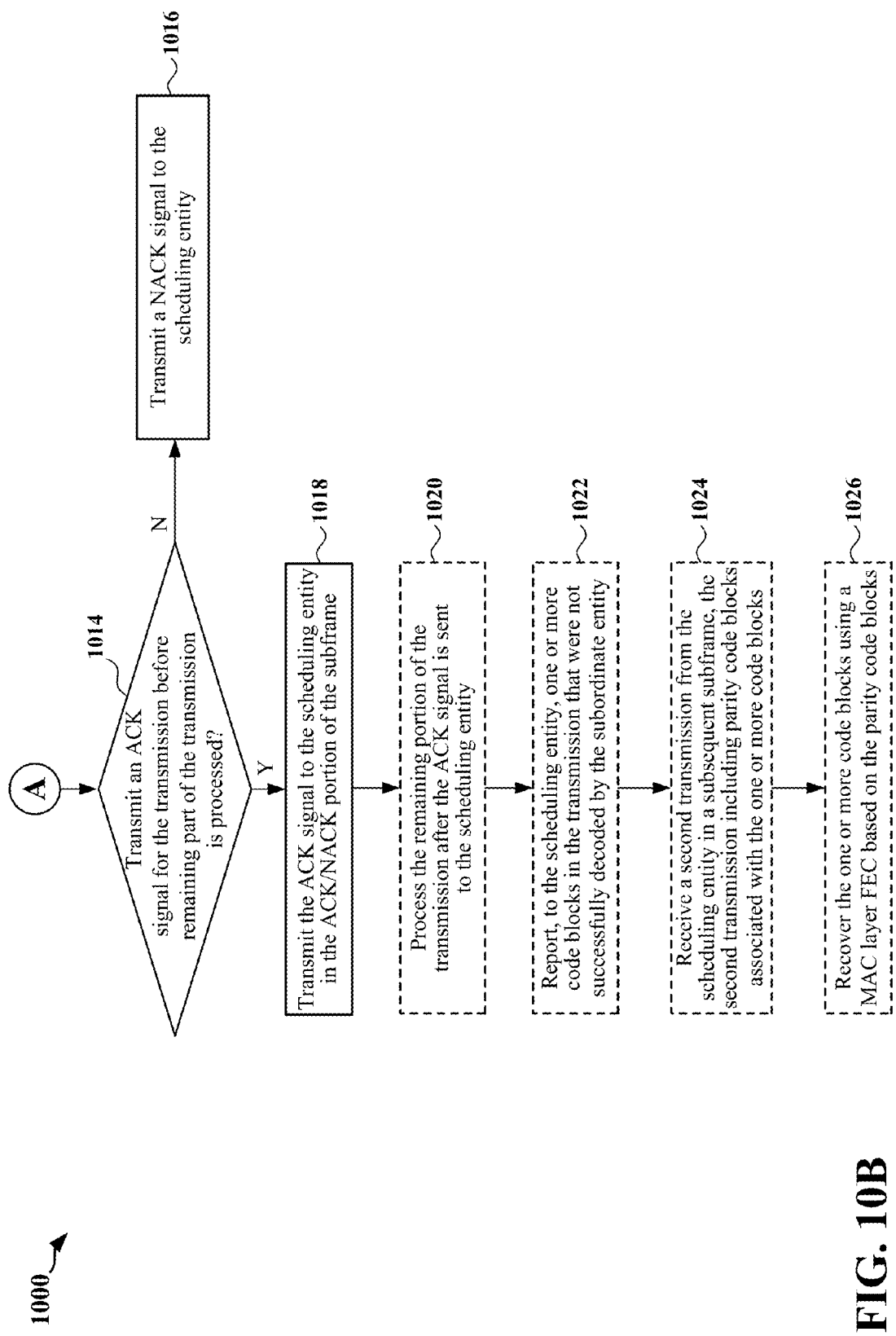

FIG. 10 (including FIGS. 10A and 10B) is a diagram 1000 illustrating an example of various methods and/or processes according to aspects of the present disclosure. The methods and/or processes may be performed by an apparatus. In some configurations, such an apparatus is the apparatus 902 described above with reference to FIG. 9. In some configurations, such an apparatus is the subordinate entity 204 (described above). It should be understood that blocks indicated with dotted lines represent optional blocks.

At block 1002, the apparatus transmits a report to the scheduling entity including a processing capability of the apparatus. For example, with reference to FIG. 7, the subordinate entity 204 may transmit a report 706 to the scheduling entity 202 including a processing capability of the subordinate entity 204.

At block 1004, the apparatus receives a configuration message from the scheduling entity based on the processing capability of the subordinate entity. In one example, the configuration message enables the subordinate entity to transmit an ACK signal for a transmission before the remaining part of the transmission is processed. For example, with reference to FIG. 7, the scheduling entity 202 may transmit a configuration message 708 to the subordinate entity 204 based on the processing capability of the subordinate entity 204.

At block 1006, the apparatus receives a transmission from the scheduling entity in a data portion of the subframe. For example, with reference to FIG. 7, the subordinate entity 204 may receive the first transmission 710 that may include the code blocks 0 to 7 previously discussed with respect to FIG. 6.

At block 1008, the apparatus processes, in the subframe, at least a part of the transmission. In one example, the apparatus may processes at least a part of the transmission by decoding n code blocks from among a total of N code blocks included in a received transmission, wherein n<N.

At block 1010, the apparatus refrains from requesting a physical layer retransmission for the transmission when the at least a part of the transmission in the subframe is successfully processed and when the remaining part of the transmission has not been processed in the subframe.

At block 1012, the apparatus refrains from transmitting a NACK signal for the transmission when the at least a part of the transmission in the subframe is successfully processed and when the remaining part of the transmission has not been processed in the subframe.

At block 1014, the apparatus determines whether to transmit an ACK signal for the transmission, the ACK signal to be transmitted in an ACK portion of the subframe before a remaining part of the transmission is processed. The data portion and the ACK portion may be contained in the subframe. In one example, the apparatus determines whether to transmit an ACK signal for the transmission by determining a number of the decoded n code blocks that have passed a CRC, and by determining to transmit the ACK signal when the number meets or exceeds a threshold value. If the number does not meet or exceed the threshold value, then at block 1016, the apparatus may transmit a NACK signal to the scheduling entity 202. Otherwise, if the number meets or exceeds the threshold value, then at block 1018, the apparatus transmits the ACK signal to the scheduling entity in the ACK portion of the subframe.

At block 1020, the apparatus processes the remaining portion of the transmission after the ACK signal is transmitted to the scheduling entity. In one example, the apparatus processes the remaining portion of the transmission in a subsequent subframe. For example, with reference to FIG. 7, after the first ACK signal 712 is transmitted by the subordinate entity 204 for the first transmission 710 in an ACK portion of the first self-contained subframe 724, the subordinate entity 204 may process the remaining part (e.g., code block 7) of the first transmission 710 during an idle period in the second self-contained subframe 726.

At block 1022, the apparatus reports, to the scheduling entity, one or more code blocks in the transmission that were not successfully decoded by the subordinate entity. For example, with reference to FIG. 7, the subordinate entity 204 may transmit a report (e.g., a MAC layer acknowledgment) 718 to the scheduling entity 202. The report 718 may indicate the number of code blocks (e.g., the number two for code blocks 7 and 15) that were not successfully decoded by the subordinate entity 204.

At block 1024, the apparatus receives a second transmission from the scheduling entity in a subsequent subframe, the second transmission including parity code blocks associated with the one or more code blocks. For example, with reference to FIG. 7, the subordinate entity 204 may receive the transmission 714, which may include parity code blocks (e.g., the parity code blocks 604 previously discussed with respect to FIG. 6).

At block 1026, the apparatus recovers the one or more code blocks using a MAC layer FEC based on the parity code blocks. In one example, the one or more code blocks are recovered without receiving a physical layer retransmission of the one or more code blocks from the scheduling entity.

Figure 11:
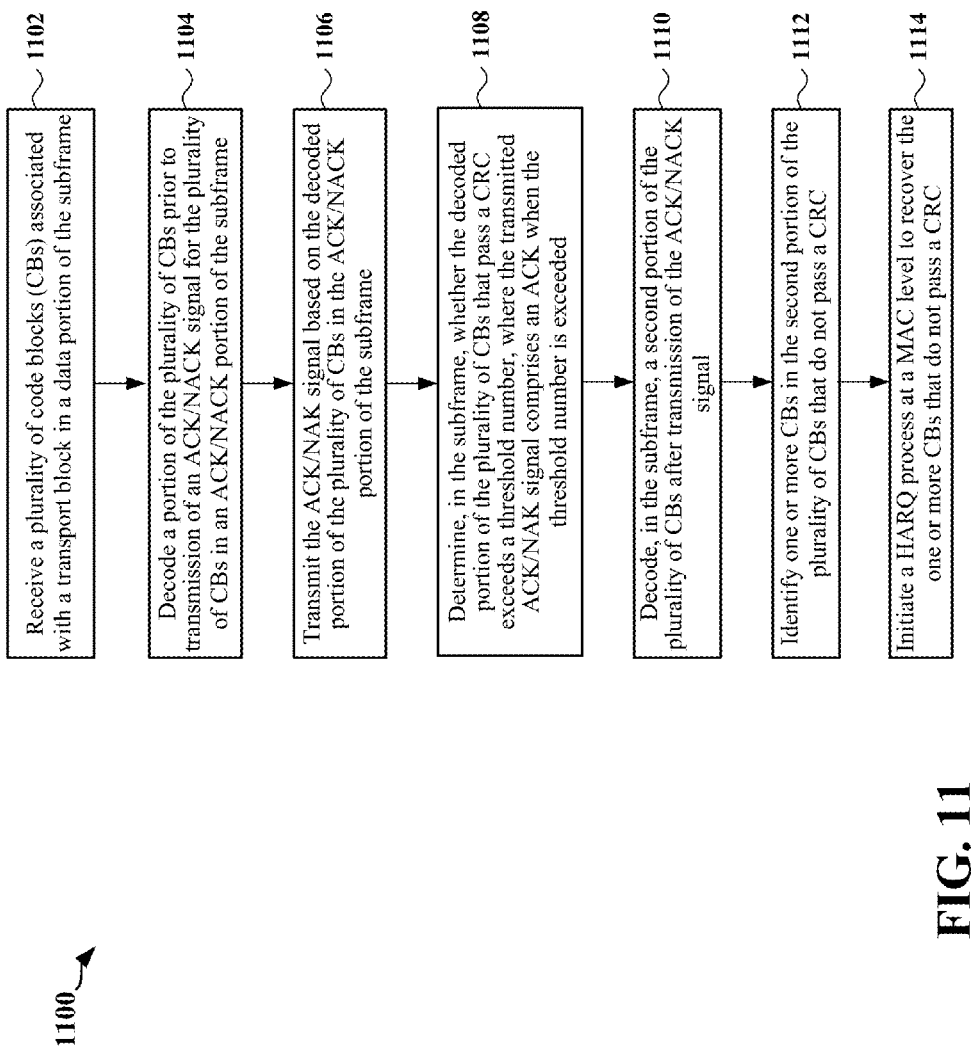
FIG. 11 is a diagram illustrating an example of various methods and/or processes according to aspects of the present disclosure.

FIG. 11 is a diagram 1100 illustrating an example of various methods and/or processes according to aspects of the present disclosure. The methods and/or processes may be performed by an apparatus. In some configurations, such an apparatus is the apparatus 902 described above with reference to FIG. 9. In some configurations, such an apparatus is subordinate entity 204 (described above).

At block 1102, the apparatus receives a plurality of code blocks associated with a transport block in a data portion of a subframe. For example, with reference to FIG. 4B, the data portion may be the data portion 454. In one example, with reference to FIG. 6, the plurality of code blocks may be the code blocks 0 to 7 in the first subframe 606.

At block 1104, the apparatus decodes a portion of the plurality of code blocks prior to transmission of an ACK signal for the plurality of code blocks in an ACK portion of the subframe. In one example, with reference to FIG. 6, the decoded portion of the plurality of code blocks may be the code blocks 0 to 6 in the first subframe 606.

At block 1106, the apparatus transmits the ACK/NAK signal based on the decoded portion of the plurality of code blocks in the ACK portion of the subframe. For example, with reference to FIG. 4B, the ACK portion may be the ACK/NACK portion 458. Here, when the ACK/NACK signal includes acknowledgment information corresponding to the data information, broadly, this refers to the ACK/NACK being configured to acknowledge, or not, the decoding and verification of corresponding packets or transport blocks included in the data information.

At block 1108, the apparatus determines, in the subframe, whether the decoded portion of the plurality of code blocks that pass a CRC exceeds a threshold number, where the transmitted ACK/NAK signal comprises an ACK when the threshold number is exceeded. For example, the threshold number may be a number based on a predetermined percentage of the plurality of code blocks. In such example, if the plurality of code blocks includes a total of eight code blocks and the predetermined percentage is 50%, the threshold number may be four (e.g., 8×0.5=4).

At block 1110, the apparatus decodes, in the subframe, a second portion of the plurality of code blocks after transmission of the ACK/NACK signal. In one example, with reference to FIG. 6, the second portion of the plurality of code blocks may be the code block 7 in the first subframe 606.

At block 1112, the apparatus identifies one or more code blocks in the second portion of the plurality of code blocks that do not pass a CRC. For example, with reference to FIG. 6, the apparatus may determine that code block 7 in the first subframe 606 does not pass CRC.

At block 1114, the apparatus initiates a HARQ process at a MAC level to recover the one or more code blocks that do not pass a CRC. For example, with reference to FIG. 6, the subordinate entity may initiate a HARQ process at a MAC level in the third subframe 614.

Figure 12:
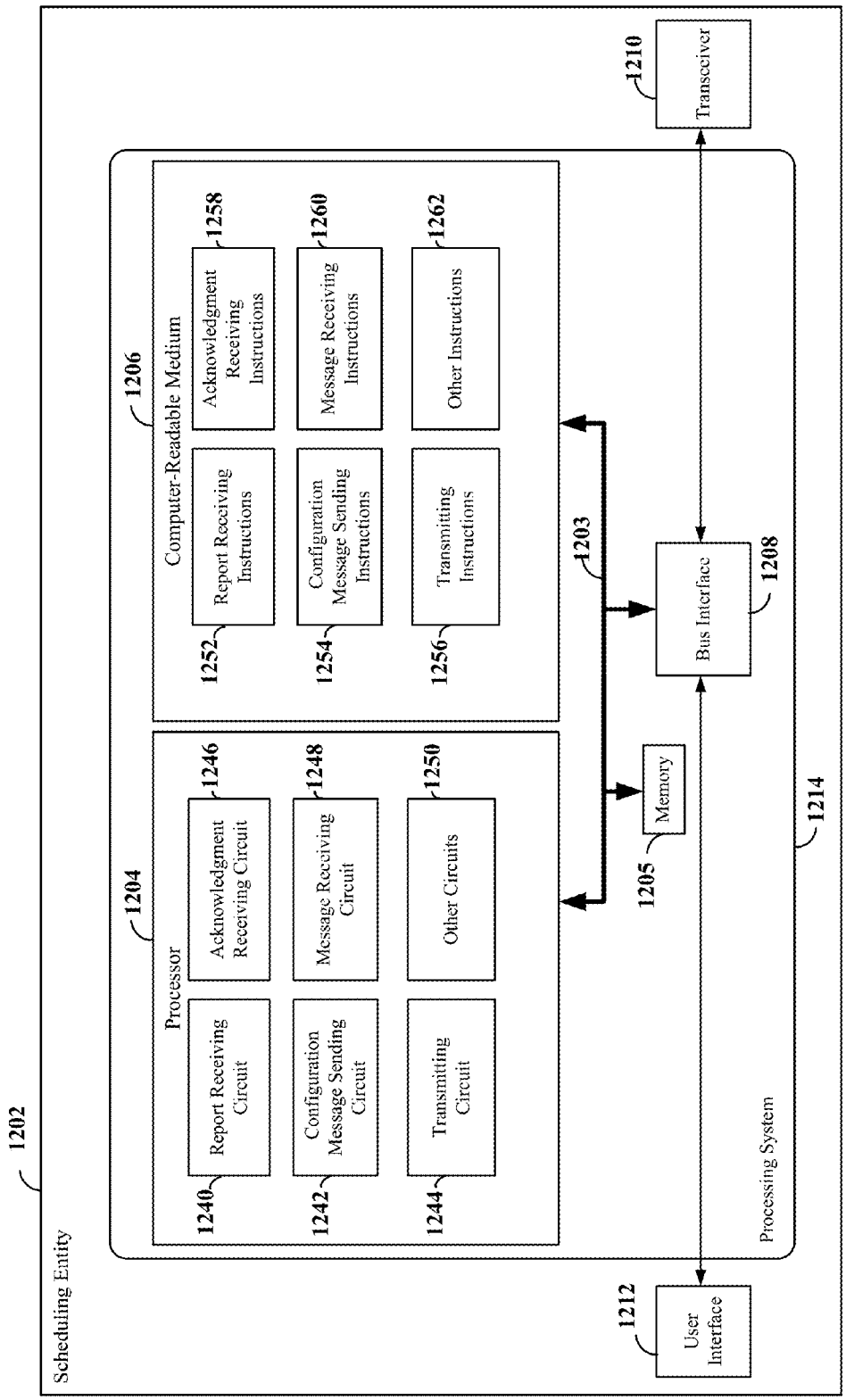
FIG. 12 is a diagram illustrating an example of a hardware implementation of an apparatus according to various aspects of the present disclosure.

FIG. 12 is a diagram illustrating an example of a hardware implementation of an apparatus 1202 according to various aspects of the present disclosure. Generally, the apparatus 1202 may be any device configured for wireless communication. In some configurations, the apparatus 1202 may be the scheduling entity 202, as described in greater detail above. In further examples, the apparatus 1202 may be any suitable radio transceiver apparatus, and in some examples, may be embodied in a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. A scheduling entity may provide wireless access points to a core network for any number of UEs.

The apparatus 1202 may include a user interface 1212. The user interface 1212 may be configured to receive one or more inputs from a user of the apparatus 1202. The user interface 1212 may also be configured to display information to the user of the apparatus 1202. The user interface 1212 may exchange data via the bus interface 1208.

The apparatus 1202 may also include a transceiver 1210. The transceiver 1210 may be configured to receive data and/or transmit data in communication with another apparatus. The transceiver 1210 provides a means for communicating with another apparatus via a wired or wireless transmission medium. In some configurations, the transceiver 1210 may provide the means for communicating with various other apparatus over a transmission medium. According to aspects of the present disclosure, the term(s) 'communicate' and/or 'communicating' refer to at least one of a transmission or a reception. In other words, without deviating from the scope of the present disclosure, the term(s) 'communicate' and/or 'communicating' may refer to a transmission without a simultaneous/concurrent reception, a reception without a simultaneous/concurrent transmission, and/or a transmission with a simultaneous/concurrent reception.

In some examples, the transceiver 1210 may provide the apparatus 1202 with the means for transmitting data (e.g., configuration message, data information) to the subordinate entity 204 as well as the means for receiving data (e.g., reports, ACK/NACK signals, messages) from subordinate entity 204. The transceiver 1210 may be configured to perform such communications using various types of technologies, as described in greater detail above. One of ordinary skill in the art will understand that many types of technologies may perform such communication without deviating from the scope of the present disclosure.

The apparatus 1202 may also include a memory 1205, one or more processors 1204, a computer-readable medium 1206, and a bus interface 1208. The bus interface 1208 may provide an interface between a bus 1203 and the transceiver 1210. The memory 1205, the one or more processors 1204, the computer-readable medium 1206, and the bus interface 1208 may be connected together via the bus 1203. The processor 1204 may be communicatively coupled to the transceiver 1210 and/or the memory 1205.

The processor 1204 may include a report receiving circuit 1240. In an aspect, a report receiving circuit 1240 may include various hardware components and/or may perform various algorithms that provide the means for receiving a report from the subordinate entity 204 including a processing capability of the subordinate entity.

The processor 1204 may also include a configuration message transmitting circuit 1242. The configuration message transmitting circuit 1242 may include various hardware components and/or may perform various algorithms that provide the means for transmitting a configuration message to the subordinate entity 204 based on the processing capability of the subordinate entity. For example, the configuration message may enable the subordinate entity 204 to transmit an ACK signal for a transmission received in a subframe before processing of the transmission is completed by the subordinate entity.

The processor 1204 may also include a transmitting circuit 1244. The transmitting circuit 1244 may include various hardware components and/or may perform various algorithms that provide the means for transmitting the transmission to the subordinate entity 204 in a data portion of the subframe. The transmitting circuit 1244 may further include various hardware components and/or may perform various algorithms that provide the means for transmitting a second transmission to the subordinate entity 204 in a subsequent subframe, the second transmission including parity code blocks associated with the one or more code blocks for a MAC layer FEC.

The processor 1204 may also include an acknowledgment receiving circuit 1246. The acknowledgment receiving circuit 1246 may include various hardware components and/or may perform various algorithms that provide the means for receiving an ACK signal for the transmission in an ACK portion of the subframe.

The processor 1204 may also include a message receiving circuit 1248. The message receiving circuit 1248 may include various hardware components and/or may perform various algorithms that provide the means for receiving, from the subordinate entity 204, a message indicating one or more code blocks in the transmission that were not successfully decoded by the subordinate entity 204.

The foregoing description provides a non-limiting example of the processor 1204 of the apparatus 1202. Although various circuits 1240, 1242, 1244, 1246, and 1248 are described above, one of ordinary skill in the art will understand that the processor 1104 may also include various other circuits 1250 that are in addition and/or alternative(s) to the aforementioned circuits 1240, 1242, 1244, 1246, and 1248. Such other circuits 1250 may provide the means for performing any one or more of the functions, methods, processes, features and/or aspects described herein.

The computer-readable medium 1206 may include various computer-executable instructions. The computer-executable instructions may include computer-executable code configured to perform various functions and/or enable various aspects described herein. The computer-executable instructions may be executed by various hardware components (e.g., the processor 1204 and/or any of its circuits 1240, 1242, 1244, 1246, 1248, and 1250) of the apparatus 1202. The computer-executable instructions may be a part of various software programs and/or software modules.

The computer-readable medium 1206 may include a report receiving instructions 1252. In one example, the report receiving instructions 1252 may include computer-executable instructions configured for receiving a report from the subordinate entity 204 including a processing capability of the subordinate entity.

The computer-readable medium 1206 may also include configuration message transmitting instructions 1254. The configuration message transmitting instructions 1254 may include computer-executable instructions configured for transmitting a configuration message to the subordinate entity 204 based on the processing capability of the subordinate entity 204. For example, the configuration message may enable the subordinate entity 204 to transmit an ACK signal for a transmission received in a subframe before processing of the transmission is completed by the subordinate entity 204.

The computer-readable medium 1206 may also include transmitting instructions 1256. The transmitting instructions 1256 may include computer-executable instructions configured for transmitting the transmission to the subordinate entity 204 in a data portion of the subframe. The transmitting instructions 1256 may include computer-executable instructions configured for transmitting a second transmission to the subordinate entity 204 in a subsequent subframe, the second transmission including parity code blocks associated with the one or more code blocks for a MAC layer FEC.

The computer-readable medium 1206 may also include acknowledgment receiving instructions 1258. The acknowledgment receiving instructions 1258 may include computer-executable instructions configured for receiving an ACK signal for the transmission in an ACK portion of the subframe.

The computer-readable medium 1206 may also include message receiving instructions 1260. The message receiving instructions 1260 may include computer-executable instructions configured for receiving, from the subordinate entity 204, a message indicating one or more code blocks in the transmission that were not successfully decoded by the subordinate entity 204.

The foregoing description provides a non-limiting example of the computer-readable medium 1206 of the apparatus 1202. Although various computer-executable instructions 1252, 1254, 1256, 1258, and 1260 are described above, one of ordinary skill in the art will understand that the computer-readable medium 1206 may also include various other computer-executable instructions 1262 that are in addition and/or alternative(s) to the aforementioned computer-executable instructions 1252, 1254, 1256, 1258, and 1260. Such other computer-executable instructions 1262 may be configured for any one or more of the functions, methods, processes, features and/or aspects described herein.

The memory 1205 may include various memory modules. The memory modules may be configured to store, and have read therefrom, various values and/or information by the processor 1204, or any of its circuits 1240, 1242, 1244, 1246, 1248, and 1250. The memory modules may also be configured to store, and have read therefrom, various values and/or information upon execution of the computer-executable code included in the computer-readable medium 1206, or any of its instructions 1252, 1254, 1256, 1258, 1260, and 1262. The foregoing description provides a non-limiting example of the memory 1205 of the apparatus 1202. Although various types of data of the memory 1205 are described above, one of ordinary skill in the art will understand that the memory 1205 may also include various other data that are in addition and/or alternative(s) to the aforementioned data. Such other data may be associated with any one or more of the functions, methods, processes, features and/or aspects described herein.

Figure 13:
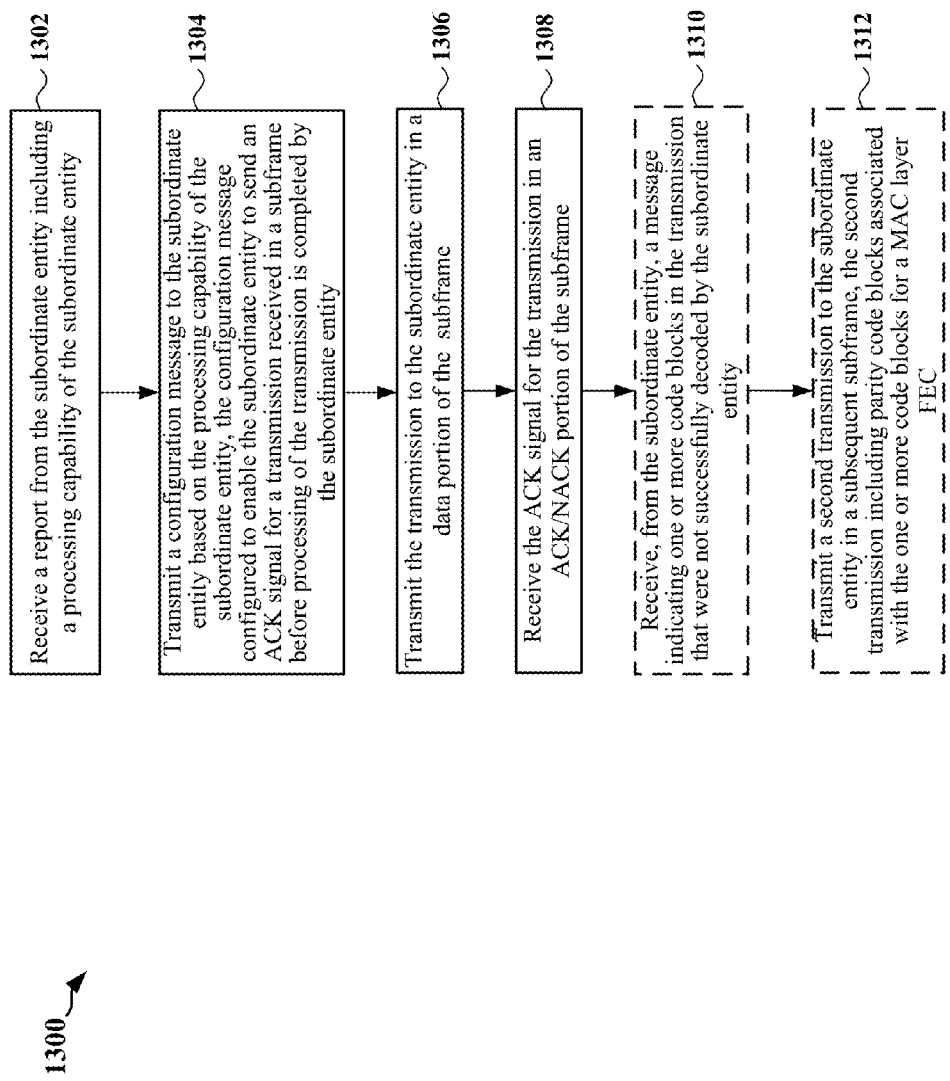
FIG. 13 is a diagram illustrating an example of various methods and/or processes according to aspects of the present disclosure.

FIG. 13 is a diagram 1300 illustrating an example of various methods and/or processes according to aspects of the present disclosure. The methods and/or processes may be performed by an apparatus. In some configurations, such an apparatus is the apparatus 1202 described above with reference to FIG. 12. In some configurations, such an apparatus is scheduling entity 202 (described above). It should be understood that blocks indicated with dotted lines represent optional blocks.

At block 1302, the apparatus receives a report from the subordinate entity including a processing capability of the subordinate entity. For example, with reference to FIG. 7, the scheduling entity 202 may receive a report 706 from the subordinate entity 204 including a processing capability of the subordinate entity 204.

At block 1304, the apparatus transmits a configuration message to the subordinate entity based on the processing capability of the subordinate entity, the configuration message configured to enable the subordinate entity to transmit an ACK signal for a transmission received in a subframe before processing of the transmission is completed by the subordinate entity. For example, with reference to FIG. 7, the scheduling entity 202 may transmit a configuration message 708 to the subordinate entity 204 based on the processing capability of the subordinate entity 204. For example, if the processing capability indicates that the subordinate entity 204 may not be able to complete processing of code blocks (e.g., code blocks including data information) in a self-contained subframe and transmit an ACK signal within a self-contained subframe, the configuration message 708 may enable the subordinate entity 204 to transmit an ACK signal (also referred to as a predictive ACK signal) before the processing of the code blocks received in a self-contained subframe is completed.

At block 1306, the apparatus transmits the transmission to the subordinate entity in a data portion of the subframe.

At block 1308, the apparatus receives the ACK signal for the transmission in an ACK portion of the subframe.

At block 1310, the apparatus receives, from the subordinate entity, a message indicating one or more code blocks in the transmission that were not successfully decoded by the subordinate entity. For example, with reference to FIG. 7, the subordinate entity 204 may then transmit a report 718 to the scheduling entity 202. The report 718 may indicate the number of code blocks (e.g., the number two for code blocks 7 and 15) that were not successfully decoded by the subordinate entity 204.

At block 1312, the apparatus transmits a second transmission to the subordinate entity in a subsequent subframe, the second transmission including parity code blocks associated with the one or more code blocks for a MAC layer FEC. For example, with reference to FIG. 7, the scheduling entity 202 may transmit the transmission 720 to the subordinate entity 204 in the fourth self-contained subframe 730. For example, the transmission 720 may include parity code blocks (e.g., parity code blocks 604 previously discussed with respect to FIG. 6). In one example, the subsequent subframe is immediately after the subframe. In one example, the second transmission in the subsequent subframe is not a physical layer retransmission of the transmission in the subframe.

As those skilled in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication in a synchronous network for a subordinate entity to communicate with a scheduling entity utilizing a time division duplex (TDD) carrier, wherein the TDD carrier comprises a subframe, the method comprising:
   receiving a transmission from the scheduling entity in a data portion of the subframe;
   processing, in the subframe, at least a part of the transmission;
   determining, in the subframe, whether to transmit an acknowledgment (ACK) signal for the transmission received in the data portion of the subframe, the ACK signal to be transmitted in an ACK portion of the subframe before a remaining part of the transmission is processed, wherein the data portion and the ACK portion are contained in the subframe; and
   transmitting the ACK signal to the scheduling entity in the ACK portion of the subframe based on the determination.

2. The method of claim 1, further comprising transmitting a report to the scheduling entity including a processing capability of the subordinate entity.

3. The method of claim 2, further comprising:
   receiving a configuration message from the scheduling entity based on the processing capability of the subordinate entity, the configuration message configured to enable the subordinate entity to transmit the ACK signal for the transmission before the remaining part of the transmission is processed.

4. The method of claim 1, wherein the processing at least a part of the transmission in the subframe comprises:
   decoding n code blocks from among a total of N code blocks included in the transmission, wherein n<N.

5. The method of claim 4, wherein the determining whether to transmit the ACK signal comprises:
   determining a number of the decoded n code blocks that have passed a cyclic redundancy check (CRC) or that have converged to a valid codeword when a low-density parity-check (LDPC) is implemented; and
   determining to transmit the ACK signal when the number meets or exceeds a threshold value.

6. The method of claim 1, further comprising:
   reporting, to the scheduling entity, one or more code blocks in the transmission that were not successfully decoded by the subordinate entity;
   receiving a second transmission from the scheduling entity in a subsequent subframe, the second transmission including parity code blocks associated with the one or more code blocks;
   recovering the one or more code blocks using a media access control (MAC) layer forward error correction (FEC) based on the parity code blocks.

7. The method of claim 6, wherein the one or more code blocks are recovered without receiving a physical layer retransmission of the one or more code blocks from the scheduling entity.

8. The method of claim 1, further comprising:
   refraining from transmitting a negative acknowledgment (NACK) signal for the transmission when the at least a part of the transmission in the subframe is successfully processed and when the remaining part of the transmission has not been processed in the subframe.

9. The method of claim 1, further comprising:
   refraining from requesting a physical layer retransmission for the transmission when the at least a part of the transmission in the subframe is successfully processed and when the remaining part of the transmission has not been processed in the subframe.

10. The method of claim 1, further comprising:
    processing the remaining portion of the transmission after the ACK signal is transmitted to the scheduling entity.

11. The method of claim 10, wherein the remaining portion of the transmission is processed in a subsequent subframe.

12. A subordinate entity configured to communicate with a scheduling entity in a synchronous wireless communication network utilizing a time division duplex (TDD) carrier comprising a subframe, comprising:
    a processor;
    a transceiver communicatively coupled to the processor; and
    a memory communicatively coupled to the processor,
    wherein the processor and the memory are configured to:
       receive a transmission from the scheduling entity in a data portion of the subframe;
       process, in the subframe, at least a part of the transmission;
       determine, in the subframe, whether to transmit an acknowledgment (ACK) signal for the transmission received in the data portion of the subframe, the ACK signal to be transmitted in an ACK portion of the subframe before a remaining part of the transmission is processed, wherein the data portion and the ACK portion being contained in the subframe; and transmit the ACK signal to the scheduling entity in the ACK portion of the subframe based on the determination.

13. The subordinate entity of claim 12, wherein the processor and the memory are further configured to transmit a report to the scheduling entity including a processing capability of the subordinate entity.

14. The subordinate entity of claim 13, wherein the processor and the memory are further configured to:
receive a configuration message from the scheduling entity based on the processing capability of the subordinate entity, the configuration message configured to enable the subordinate entity to transmit the ACK signal for the transmission before the remaining part of the transmission is processed.

15. The subordinate entity of claim 12, wherein the processor and the memory are configured to process the at least a part of the transmission in the subframe by decoding n code blocks from among a total of N code blocks included in transmission, wherein n<N, and wherein the processor is configured to operate with at least one of a reduced clock rate or reduced operating voltage level when decoding the n code blocks from among the total of N code blocks to lower power consumption in the subordinate entity.

16. The subordinate entity of claim 15, wherein the processor and the memory configured to determine whether to transmit the ACK signal are further configured to:
determine a number of the decoded n code blocks that are successfully decoded; and
determine to transmit the ACK signal when the number meets or exceeds a threshold value.

17. The subordinate entity of claim 12, wherein the processor and the memory are further configured to:
report, to the scheduling entity, one or more code blocks in the transmission that were not successfully decoded by the subordinate entity;
receive a second transmission from the scheduling entity in a subsequent subframe, the second transmission including parity code blocks associated with the one or more code blocks;
recover the one or more code blocks using a media access control (MAC) layer forward error correction (FEC) based on the parity code blocks.

18. The subordinate entity of claim 17, wherein the one or more code blocks are recovered without receiving a physical layer retransmission of the one or more code blocks from the scheduling entity.

19. The subordinate entity of claim 12, wherein the processor and the memory are further configured to:
refrain from transmitting a negative acknowledgment (NACK) signal for the transmission when the remaining part of the transmission has not been processed in the subframe.

20. The subordinate entity of claim 12, wherein the processor and the memory are further configured to:
refrain from requesting a physical layer retransmission for the transmission when the remaining part of the transmission has not been processed in the subframe.

21. The subordinate entity of claim 12, wherein the processor and the memory are further configured to:
process the remaining portion of the transmission after the ACK signal is transmitted to the scheduling entity.

22. The subordinate entity of claim 21, wherein the remaining portion of the transmission is processed in a subsequent subframe.

23. A method of wireless communication in a synchronous network for a scheduling entity to communicate with a subordinate entity utilizing a time division duplex (TDD) carrier, wherein the TDD carrier comprises a subframe, the method comprising:
receiving a report from the subordinate entity including a processing capability of the subordinate entity;
transmitting a configuration message to the subordinate entity based on the processing capability of the subordinate entity, the configuration message configured to enable the subordinate entity to transmit an acknowledgment (ACK) signal in an ACK portion of the subframe for a transmission received in a data portion of the subframe before processing of the transmission received in the data portion of the subframe is completed by the subordinate entity;
transmitting the transmission to the subordinate entity in the data portion of the subframe; and
receiving the ACK signal for the transmission in the ACK portion of the subframe.

24. The method of claim 23, further comprising:
receiving, from the subordinate entity, a message indicating one or more code blocks in the transmission that were not successfully decoded by the subordinate entity; and
transmitting a second transmission to the subordinate entity in a subsequent subframe, the second transmission including parity code blocks associated with the one or more code blocks for a media access control (MAC) layer forward error correction (FEC).

25. The method of claim 24, wherein the subsequent subframe is immediately after the subframe.

26. The method of claim 24, wherein the second transmission in the subsequent subframe is not a physical layer retransmission of the transmission in the subframe.

27. A scheduling entity configured to manage a synchronous wireless communication network utilizing a time division duplex (TDD) carrier comprising a subframe, comprising:
a processor;
a transceiver communicatively coupled to the processor; and
a memory communicatively coupled to the processor,
wherein the processor and the memory are configured to:
receive a report from a subordinate entity including a processing capability of the subordinate entity;
transmit a configuration message to the subordinate entity based on the processing capability of the subordinate entity, the configuration message configured to enable the subordinate entity to transmit an acknowledgment (ACK) signal in an ACK portion of the subframe for a transmission received in a data portion of the subframe before processing of the transmission received in the data portion of the subframe is completed by the subordinate entity;
transmit the transmission to the subordinate entity in the data portion of the subframe; and
receive the ACK signal for the transmission in the ACK portion of the subframe.

28. The scheduling entity of claim 27, wherein the processor and the memory are further configured to:
receive, from the subordinate entity, a message indicating one or more code blocks in the transmission that were not successfully decoded by the subordinate entity; and transmit a second transmission to the subordinate entity in a subsequent subframe, the second transmission including parity code blocks associated with the one or more code blocks for a media access control (MAC) layer forward error correction (FEC).

29. The scheduling entity of claim 28, wherein the subsequent subframe is immediately after the subframe.

30. The scheduling entity of claim 28, wherein the second transmission in the subsequent subframe is not a physical layer retransmission of the transmission in the subframe.

* * * * *